US012625355B2

(12) United States Patent
Knebel et al.

(10) Patent No.: US 12,625,355 B2
(45) Date of Patent: May 12, 2026

(54) MICROSCOPE AND METHOD FOR MICROSCOPIC EXAMINATION OF LARGE SAMPLES

(71) Applicant: Leica Microsystems CMS GmbH, Wetzlar (DE)

(72) Inventors: Werner Knebel, Kronau (DE); Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 943 days.

(21) Appl. No.: 17/415,757

(22) PCT Filed: Dec. 23, 2019

(86) PCT No.: PCT/EP2019/086939
§ 371 (c)(1),
(2) Date: Jun. 18, 2021

(87) PCT Pub. No.: WO2020/128095
PCT Pub. Date: Jun. 25, 2020

(65) Prior Publication Data
US 2022/0137385 A1      May 5, 2022

(30) Foreign Application Priority Data

Dec. 21, 2018      (DE) ..................... 10 2018 222 876.0

(51) Int. Cl.
*G02B 21/00*          (2006.01)
*G02B 21/06*          (2006.01)
(52) U.S. Cl.
CPC ..... *G02B 21/0036* (2013.01); *G02B 21/0028* (2013.01); *G02B 21/0032* (2013.01); *G02B 21/008* (2013.01); *G02B 21/06* (2013.01)

(58) Field of Classification Search
CPC .. G02B 21/00; G02B 21/0004; G02B 21/002; G02B 21/0024; G02B 21/0028;
(Continued)

(56) References Cited

U.S. PATENT DOCUMENTS 5,969,854 A      10/1999  Stelzer et al.
7,015,444 B2 *    3/2006  Kawano ............... G02B 21/004
250/201.3
(Continued)

FOREIGN PATENT DOCUMENTS

CN          107924048 A      4/2018
CN          108254909 A      7/2018
(Continued)

*Primary Examiner* — Thong Q Nguyen
(74) *Attorney, Agent, or Firm* — LEYDIG, VOIT & MAYER, LTD.

(57)                    ABSTRACT

A microscope, which is a confocal microscope converted into a light sheet microscope, includes a microscope body and a mechanical receiving apparatus for microscope objectives, through which a microscope beam path extends. An optical module attachable to the receiving apparatus is configured to illuminate a sample volume and collect and transmit light from the sample volume. The optical module comprises: first and second optical arrangements with first and second beam paths that intersect in the sample volume, an optical beam path selector configured to combine the first and/or second beam path with the microscope beam path, and an attachment element arranged between the first or second optical arrangement and the sample volume, wherein the first or second beam path extend at least in sections through the attachment element in order to generate a light sheet. An area sensor is configured to detect light collected from the sample volume.

25 Claims, 11 Drawing Sheets

(58) Field of Classification Search

CPC ............ G02B 21/0032; G02B 21/0036; G02B 21/0048; G02B 21/0064; G02B 21/0068; G02B 21/0076; G02B 21/008; G02B 21/02; G02B 21/04; G02B 21/06; G02B 21/18; G02B 21/361

USPC .................................................. 359/368–398

See application file for complete search history.

(56) References Cited

U.S. PATENT DOCUMENTS

| | | | | |
|---|---|---|---|---|
| 8,040,495 | B2 * | 10/2011 | Hendriks ............... | G01N 21/49 |
| | | | | 356/73 |
| 8,570,649 | B2 * | 10/2013 | Truong .............. | G01N 21/6408 |
| | | | | 359/368 |
| 9,030,734 | B2 * | 5/2015 | Knebel .............. | G02B 21/0076 |
| | | | | 359/213.1 |
| 9,664,620 | B2 * | 5/2017 | Lippert ................ | G02B 21/367 |
| 10,261,300 | B2 | 4/2019 | Lippert et al. | |
| 10,712,553 | B2 | 7/2020 | Siebenmorgen et al. | |
| 10,775,599 | B2 | 9/2020 | Gugel et al. | |
| 10,908,403 | B2 | 2/2021 | Knop et al. | |
| 10,983,322 | B2 * | 4/2021 | Kalkbrenner ........ | G02B 21/006 |
| 2010/0067103 | A1 | 3/2010 | Sangu | |

| | | | | |
|---|---|---|---|---|
| 2016/0139394 | A1 * | 5/2016 | Taniguchi .......... | G02B 21/0088 |
| | | | | 359/392 |
| 2016/0363752 | A1 | 12/2016 | Mizunaka et al. | |
| 2017/0139193 | A1 | 5/2017 | Iguchi | |
| 2017/0293128 | A1 | 10/2017 | Schnitzler et al. | |
| 2018/0052314 | A1 * | 2/2018 | Brinkman .............. | G02B 21/22 |
| 2021/0063714 | A1 | 3/2021 | Fahrbach et al. | |

FOREIGN PATENT DOCUMENTS

| | | |
|---|---|---|
| DE | 196 29 725 A1 | 2/1998 |
| DE | 198 51 240 C1 | 3/2000 |
| DE | 19914049 C1 | 10/2000 |
| DE | 102014114469 A1 | 4/2016 |
| JP | 2001264268 A | 9/2001 |
| JP | 2006003521 A | 1/2006 |
| JP | 2009216453 A | 9/2009 |
| JP | 2010 072015 A | 4/2010 |
| JP | 2014507014 A | 3/2014 |
| JP | 2016525229 A | 8/2016 |
| JP | 2017003748 A | 1/2017 |
| JP | 2017090851 A | 5/2017 |
| JP | 2018032009 A | 3/2018 |
| WO | WO 2018/148309 A1 | 8/2018 |
| WO | WO 2019/170413 A1 | 9/2019 |

* cited by examiner

MICROSCOPE AND METHOD FOR MICROSCOPIC EXAMINATION OF LARGE SAMPLES

CROSS-REFERENCE TO PRIOR APPLICATIONS

This application is a U.S. National Phase application under 35 U.S.C. § 371 of International Application No. PCT/EP2019/086939, filed on Dec. 23, 2019, and claims benefit to German Patent Application No. DE 10 2018 222 876.0, filed on Dec. 21, 2018. The International Application was published in German on Jun. 25, 2020, as WO 2020/128095 A2 under PCT Article 21(2).

FIELD

The invention relates to a microscope, in particular a confocal microscope converted into a light sheet microscope, and a method for observing a sample volume by means of a microscope, in particular a confocal microscope converted into a light sheet microscope.

BACKGROUND

Microscopes of the type set forth above, i.e., light sheet microscopes and confocal microscopes, are known from the prior art. The solutions known from the prior art are limited in respect of the possible sample dimensions and therefore offer little flexibility and/or accuracy when examining large samples.

SUMMARY

In an embodiment, the present invention provides a microscope, in particular a confocal microscope converted into a light sheet microscope. The microscope includes a microscope body and a mechanical receiving apparatus for microscope objectives, through which a microscope beam path extends. An optical module is attachable to the receiving apparatus and is configured to illuminate a sample volume and collect and transmit light from the sample volume. The optical module comprises: a first optical arrangement with a first beam path, a second optical arrangement with a second beam path which intersects the first beam path in the sample volume, an optical beam path selector which is configured to combine the first beam path and/or the second beam path with the microscope beam path, and an attachment element arranged between the first optical arrangement or the second optical arrangement and the sample volume, wherein the first beam path or the second beam path extend at least in sections through the attachment element in order to generate a light sheet. An area sensor is configured to detect light collected from the sample volume.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
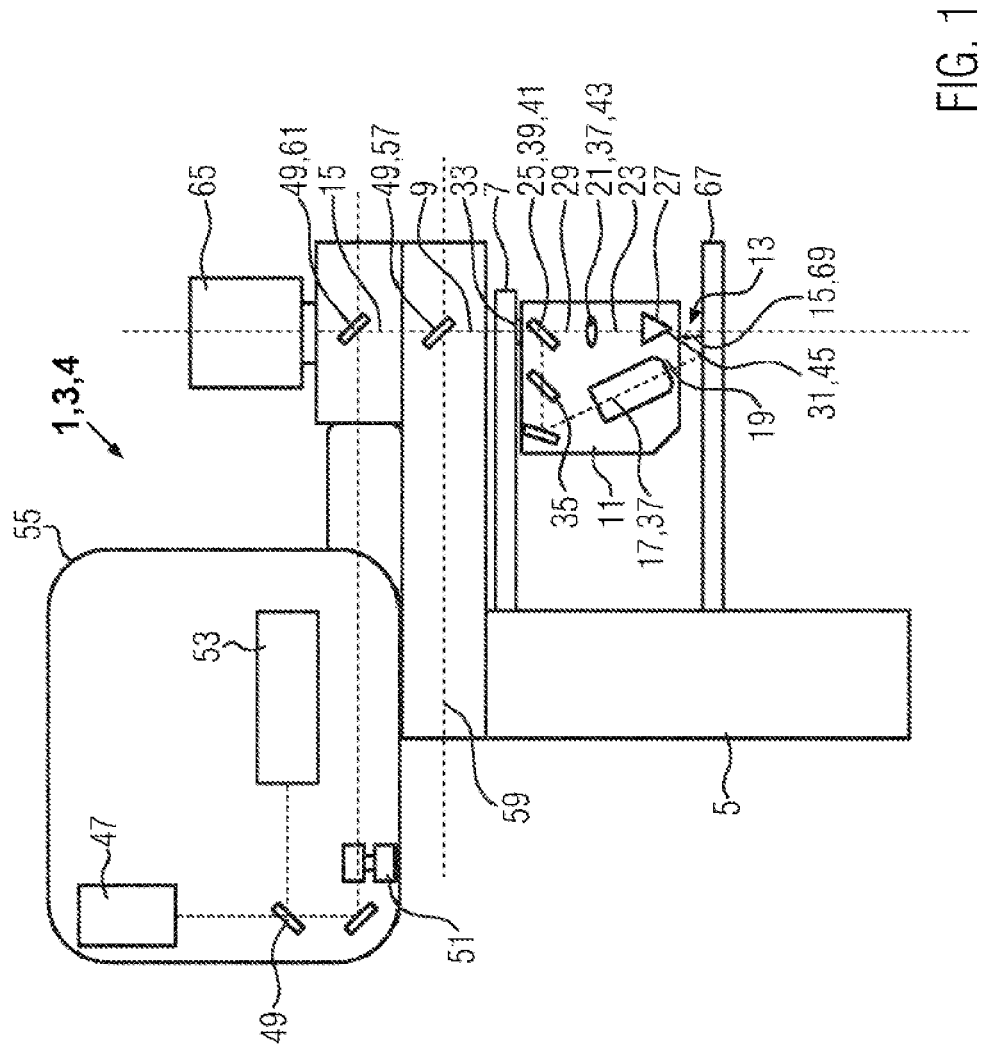
FIG. 1 shows a schematic structure of the microscope according to an embodiment of the invention.

Embodiments of the present invention improve the known microscopes of the aforementioned type such that larger samples can be examined.

For the microscope set forth at the outset, this improvement is achieved, according to an embodiment of the invention, by virtue of the microscope comprising a microscope body, a mechanical receiving apparatus for microscope objectives, through which a microscope beam path extends, and an optical module which is able to be attached to the receiving apparatus and which serves to illuminate a sample volume and collect and transmit light from the sample volume, wherein the optical module comprises a first optical arrangement with a first beam path; a second optical arrangement with a second beam path which intersects the first beam path in the sample volume; an optical beam path selector which combines the first beam path and/or the second beam path with the microscope beam path; and an attachment element between the first optical arrangement or the second optical arrangement and the sample volume, the first beam path or the second beam path extending at least in sections through the attachment element, and wherein the microscope comprises an area sensor for detecting light collected from the sample volume.

Further, the method set forth above is improved by an embodiment of the present invention by virtue of the method comprising the following method steps:

illuminating the sample volume through an optical module attached to a microscope body, along a first beam path or along a second beam path which intersects the first beam path;

collecting and transmitting light emitted by the sample
volume through the optical module along the first beam
path;

guiding the first or second beam path through an attach-
ment element arranged between a first or second optical
arrangement and the sample volume; and detecting light collected from the sample volume using an
area sensor.

The attachment element according to an embodiment of
the invention renders it possible to modify an orientation of
the first and/or second optical arrangement with respect to
the sample volume and/or a distance therebetween. Conse-
quently, a flexible and compact design of the optical module
is possible. Further, the attachment element can deflect the
first or the second beam path.

Furthermore, the improvement specified above is
achieved according to an embodiment of the present inven-
tion in inventive fashion by way of a microscope, in par-
ticular a confocal microscope converted into a light sheet
microscope, which comprises a microscope body, a
mechanical receiving apparatus for microscope objectives,
through which a microscope beam path extends, and an
optical module which is able to be attached to the receiving
apparatus and which serves to illuminate a sample volume
and collect and transmit light from the sample volume,
wherein the optical module comprises:

a first optical arrangement with a first beam path;

a second optical arrangement with a second beam path
which intersects the first beam path in the sample
volume;

an input coupling site for illumination light—preferably
illumination light transported by means of an optical
fiber—for illuminating part of the sample volume by
way of the first beam path and/or the second beam path;
and an attachment element between the first optical arrange-
ment or the second optical arrangement and the sample
volume, the first beam path or the second beam path
extending at least in sections through the attachment
element, wherein the microscope comprises a sensor, preferably an
area sensor, for detecting light collected from the
sample volume.

The input coupling site for the illumination light can be
arranged at a housing of the optical module. The input
coupling site could have a passage for the freely traveling
illumination light. Alternatively, a fiber coupler for an opti-
cal fiber could be provided at the housing of the optical
module, by means of which the illumination light for illu-
minating part of the sample volume can be transported by
way of the first beam path and/or the second beam path.

Furthermore, the improvement specified above is
achieved according to an embodiment of the present inven-
tion in inventive fashion by way of an optical module for
illuminating a sample volume and for collecting and trans-
mitting light from the sample volume, in particular using a
confocal microscope converted into a light sheet micro-
scope, wherein the optical module is adaptable to a mechani-
cal receiving apparatus of a microscope for microscope
objectives, with a microscope beam path extending through
the receiving apparatus, wherein the optical module com-
prises:

a first optical arrangement with a first beam path;

a second optical arrangement with a second beam path
which intersects the first beam path in the sample
volume;

an input coupling site for illumination light—preferably
illumination light transported by means of an optical
fiber—for illuminating part of the sample volume by
way of the first beam path and/or the second beam path;
or an optical beam path selector which combines the
first beam path and/or the second beam path with the
microscope beam path; and an attachment element between the first optical arrange-
ment or second optical arrangement and the sample
volume, the first beam path or the second beam path
extending at least in sections through the attachment
element, wherein the microscope comprises an area sensor for
detecting light collected from the sample volume.

The microscope according to embodiments of the inven-
tion and the method according to embodiments of the
invention can be further improved by the configurations
described below, each of which is advantageous on its own.
Technical features of the configurations can be combined
with one another or omitted as desired, provided the tech-
nical effect obtained by the omitted feature does not matter
in the specific configuration.

The optical arrangements can comprise a plurality of
individual lenses or a lens system and can preferably be
configured as a microscope objective. The configuration as
a microscope objective, in particular, allows a simple access
to and replacement of the entire optical arrangement. The
beam paths are each defined by the respective optical
arrangement and the microscope beam path is defined by
optical elements of the microscope.

The attachment element is preferably situated on a side of
the respective optical arrangement facing the sample and can
be understood to be a three-dimensional body that is trans-
parent to the utilized light, through which the illumination
light or detection light is transmitted.

Preferably, use can be made of light in the ultraviolet,
visible, and near infrared spectral range. By way of example,
the illumination can be implemented with ultraviolet light,
which preferably has a wavelength corresponding to an
excitation wavelength of a fluorescing substance. Hence,
fluorescence light emitted by the fluorescent substance can
be emitted by the sample in the visible spectral range or in
the near infrared spectral range, with a longer wavelength in
comparison with the excitation wavelength, and can be
collected and transmitted by the optical module. In the state
where it is attached to the receiving apparatus, the optical
module can be held at the microscope body in a manner
rotatable relative to the microscope body.

In a possible configuration of the microscope according to
the invention, the microscope can have at least two operating
states from the following list of operating states:

a scanning microscopic mode;

a nonlinear illumination mode;

a confocal mode;

a light field mode; and a light sheet mode.

Since such a configuration of the microscope conse-
quently combines a multiplicity of microscopic processes, it
is usable in versatile fashion and a sample intended to be
examined by a plurality of microscopic methods can remain
in a single microscope according to the invention, in par-
ticular in the sample volume of the microscope, and need not
be moved to another microscope for further examination.

By way of example and in non-restrictive fashion, the
nonlinear illumination mode can be a multiphoton mode, a
second harmonic mode, a third harmonic mode, or a CARS mode. The principles of these microscopy modes are known from the prior art and are therefore not explained in more detail here.

The microscope according to the invention can be further improved by virtue of the microscope comprising a switchover apparatus, by means of which the microscope is at least switchable into a first microscopy mode or a light sheet mode in reversible and repeated fashion.

In particular, the first microscopy mode can be the scanning microscopy mode or the confocal mode.

Consequently, the sample does not need to be moved from the sample volume and the microscope does not need to be moved in order to alternate between a plurality of microscopic methods. Therefore, images recorded by the area sensor and/or a point detector can be correlated with one another without complicated transformations of the image data, which are implemented while the images are recorded or thereafter. Consequently, the sample can remain at a fixed location and can be examined using different microscopy methods, and so a sample positioned in the image sections of the different microscopic methods is always imaged at the same location in the recorded image data.

A corresponding method according to the invention consequently further comprises the method step of switching over between a first microscopy mode and a light sheet mode, wherein in the first microscopy mode the sample volume is illuminated along the first beam path and in the light sheet mode the sample volume is illuminated along the second beam path. Essentially, the switchover between the operating states can consequently relate to a light path of illumination light. Preferably, the detected light emitted from the sample from the sample volume is always collected and transmitted by the first optical arrangement along the first optical beam path.

This configuration of the microscope according to the invention consequently allows repeated changes in the operating states of the microscope without this requiring a renewed adjustment of the microscope and/or a change in the relative position of the sample. Consequently, the switchover between the operating states requires no additional outlay and can be introduced seamlessly into existing workflows within the scope of the microscopic examination of samples.

In a further advantageous configuration of the microscope according to the invention, the optical beam path selector can be a wavelength-selective optical element. By way of example and in nonrestrictive fashion, a dichroic mirror is a possible wavelength-selective optical element. Such dichroic mirrors are known from the prior art and are not explained in more detail here.

Further, it is also conceivable for the optical beam path selector according to the invention to be based on other optical, wavelength-selective principles, for example diffraction or refraction.

Preferably, the wavelength-selective optical element can be used at an angle of incidence of approximately 45°. However, angles of incidence deviating from this configuration and ranging from 10° to 80° are also possible.

The microscope according to the invention can be improved by virtue of the second optical arrangement being configured as a light sheet module for generating a light sheet that passes through the sample volume. This is advantageous in that such a light sheet module can easily be exchanged or replaced. Consequently, a light sheet with different properties in the sample can be generated by virtue of inserting a light sheet module with other properties into the optical module. A light sheet module, too, can be configured as a microscope objective. This is advantageous in that such a light sheet module can easily replace a microscope objective. Preferably, the light sheet module has a fastening arrangement, known from microscopy, in the form of a (preferably standardized) bayonet cap, a thread, or a dovetail guide.

The attachment element is preferably arranged at the light sheet module.

The light sheet generated in the sample volume can be generated by an optical element that only focuses along one direction, for example a cylindrical lens. Further, it is possible to quickly move a focused beam in the sample volume by way of a deflection unit. Provided this movement is faster than a sampling rate of the detection, such scanning of the sample volume is no longer identifiable as a movement and this is referred to as a virtual light sheet.

In a further advantageous configuration of the microscope according to the invention, the wavelength-selective optical element can have at least one spectral filter edge which separates a first spectral range from a second spectral range. In this context, the wavelength-selective optical element can have different transmission and reflection properties for the first spectral range and for the second spectral range. In the light sheet mode the spectral filter edge can lie spectrally between a first wavelength of light radiated into the sample volume and a second wavelength of light collected from the sample volume, whereas in the first microscopy mode the first wavelength and the second wavelength of the light can lie together in the first spectral range or in the second spectral range.

Consequently, the radiated-in light at the first wavelength can be transmitted through the wavelength-selective optical element in the light sheet mode whereas the light at the second wavelength emitted by the sample is reflected by the wavelength-selective optical element.

By contrast, both wavelengths can be transmitted or reflected by the wavelength-selective optical element in the first microscopy mode.

Further, the wavelength-selective optical element can also have two or more filter edges. Thus, the wavelength-selective optical element can comprise, e.g., a transmissive bandpass filter and a reflective bandstop filter, with light of three adjoining spectral ranges being alternately transmitted or reflected by the wavelength-selective optical element. In respect of the aforementioned relative spectral position of the wavelengths in relation to the filter edge, both filter edges have to be considered in this configuration. Thus, for example, the first and the second wavelength can be arranged on a common side of a first filter edge, but a second filter edge can be arranged between the wavelengths. In such a case, the microscope can be in the light sheet mode since the first wavelength is located in a spectral range of high reflection and the second wavelength is located in a range of high transmission.

Moreover, there is the option of both wavelengths including the transmitting or reflecting band of the bandpass or bandstop filter. In such a case, the microscope can be in the first microscopy mode.

If the assumption is made of alternating reflective and transmissive spectral ranges, it is also possible for more than two filter edges to be situated between the two wavelengths. If there is an even number of filter edges the microscope is in the first microscopy mode; by contrast, if the number is odd, the two wavelengths are spatially separated from one another by the wavelength-selective optical element, i.e., the microscope is in the light sheet mode.

If a filter edge (or an odd number of filter edges) is included by the two wavelengths, either the shorter wavelength or the longer wavelength can be reflected and, accordingly, the longer wavelength or the shorter wavelength can be transmitted, depending on the transmission and reflection characteristic of the filter.

The microscope according to the invention can be further improved by virtue of the switchover apparatus comprising at least one element of the list of elements comprising a wavelength-changeable light source;

a light source with at least two different emission wavelengths that are able to be switched independently of one another;

a wavelength-changing optical element for varying the wavelength of the radiated-in light;

an optical retardation element for varying the polarization of the radiated-in light; and a beam path selector changing module for alternately or independently introducing at least two beam path selectors into the microscope beam path.

In a corresponding configuration of the method according to the invention, the switchover between a first microscopy mode and a light sheet mode can comprise at least one method step of the list of the following method steps:

exchanging an optical beam path selector which combines the first beam path and/or the second beam path with a microscope beam path;

altering the wavelength of illumination light radiated-in by means of a wavelength-changeable light source and/or a wavelength-changing optical element; and varying the polarization of the radiated-in illumination light by means of an optical retardation element.

By way of example, the light source with the emission wavelengths that are switchable independently of one another can be a laser with switchable laser lines. Alternatively, this configuration of the light source can be configured as a module which can comprise a plurality of lasers. Preferably, one wavelength can be fixedly adjustable, and two further wavelengths can be optionally able to be added thereto, i.e., for example, in alternating fashion. Purely by way of example and in nonrestrictive fashion, one laser (e.g., at 488 nm) can be deactivated and another laser (e.g., at 561 nm) can be activated in its place. Any other combinations of emission wavelengths of the lasers available in the prior art are conceivable.

Consequently, according to a first general approach, a relative spectral position of the at least two wavelengths of the light radiated into the sample volume or collected therefrom can be altered in respect of the at least one filter edge. In particular, the relative spectral position can be altered in such a way that the two wavelengths are situated on one side of the filter edge or that both wavelengths spectrally include the filter edge. The aforementioned relations in view of the relative spectral position should be understood in view of the wavelength of the light and the wavelength at which the filter edge is located. By way of example, if a first wavelength and a second wavelength include the filter edge, this means that the wavelength at which the filter edge is located is longer than the first wavelength and shorter than the second wavelength, the wavelengths being able to be interchanged without loss of generality.

In the case of the first approach mentioned above, there now is the option of varying at least one of the two wavelengths and maintaining the relative spectral position of the filter edge. This can be implemented purely in exemplary fashion by means of the wavelength-changeable light source, for example by a spectral selection of the light output by a laser, for example a white light laser. In this case, the wavelengths of the white light laser or of a broadband laser can be selected by means of suitable apparatuses. By way of example and in nonrestrictive fashion, such a selection can be carried out by acousto-optic apparatuses, such as acousto-optic transmission filters (AOTF) or acousto-optic beam splitters (AOBS).

Consequently, if the wavelength of the illumination light is varied, the latter can be displaced beyond the spectral filter edge, wherein the transmission and reflection property of the beam path sector alters for the varied wavelength.

It is likewise conceivable to use other broadband lasers for illumination purposes, with the wavelength of the output light being adjustable in the case of these lasers. The use of at least one diode laser is also conceivable. By way of example, by varying the operating current and/or the operating temperature, diode lasers can be tuned, i.e., varied, within certain limits in terms of the wavelength output thereby. A module comprising a plurality of switchable lasers, for example diode lasers, can be used for example in an alternative configuration.

In the case of a second approach, the relative position of the at least two wavelengths is likewise varied in respect of the filter edge; however, the wavelengths remain constant in this case and it is the relative spectral position of the filter edge that is varied, i.e., the wavelength at which the filter edge is located is altered. This can be implemented by the beam path selector changing module by virtue of a beam path selector being replaced by a further beam path selector or by virtue of, alternatively, the further beam path selector being introduced into the microscope beam path in addition to the beam path selector.

As an alternative or in addition thereto, use can be made of a dichroic graduated neutral density filter. The latter is characterized in that the relative spectral position of the filter edge depends on the position in the graduated neutral density filter.

Two beam path selectors introduced into the microscope beam path can also facilitate a switchover of the operating state of the microscope, for example reflect both wavelengths, only in the combination of the respective transmission and reflection properties thereof.

A non-restrictive example should be presented below. Here, the assumption is made of two wavelengths, the second wavelength being longer than the first wavelength, and the beam path selector as wavelength-selective element being equipped with a filter edge located between the two wavelengths, the first wavelength being located in a first spectral range of the wavelength-selective element and the second wavelength being located in a second spectral range of the wavelength-selective element. In the first spectral range an (ideally assumed) transmission of 1 can be present whereas in the second spectral range there is a (likewise ideally assumed) reflection of 1 and a transmission of 0.

In this relative arrangement of the wavelengths and the filter edge the microscope is in the light sheet mode. Now, a second beam path selector with a filter edge located at a wavelength longer than the second wavelength can be introduced into the microscope beam path, with both wavelengths lying in the first spectral range of the further beam path selector and both being reflected. This corresponds to the first microscopy mode. The microscope can provide one or more filter wheels which facilitates or facilitate such a change between the beam path selectors. A filter wheel is one possible configuration of a switchover apparatus.

In this example, it is likewise conceivable for the further beam path selector to be able to be introduced into the microscope beam path in addition to the beam path selector already present in the microscope beam path. In this case, the further beam path selector can be a shortpass filter, for example, the filter edge of which likewise is located between the two wavelengths. The combination of the beam path selector (longpass filter) with the further beam path selector (shortpass filter) likewise switches the microscope from the light sheet mode into the first microscopy mode.

In a further advantageous configuration, the microscope can comprise at least one light source which emits light in at least two different wavelength ranges, for example a laser module with at least two diode lasers, wherein light of the at least one light source of the at least two different wavelength ranges is able to be coupled independently of one another into the microscope beam path, wherein at least two of the different wavelength ranges of the light source lie in different spectral ranges of the wavelength-selective optical element.

The two different wavelength ranges can consequently be generated by a single light source or else by a plurality of light sources.

By way of the suitable choice of the beam path selector, it is possible to change very quickly between the two beam paths 1 and 2 without mechanical movements of a part if the filter edge of the selector is located between the two wavelengths. This can be used for photomanipulation. The change of wavelengths can be implemented within microseconds (e.g., by using an AOTF for switching the wavelengths). If use is made of a galvanometer scanner, a targeted illumination at a certain wavelength in a certain sample region can be implemented in the millisecond range by way of a simple offset of the position of the galvo mirror.

If an acousto-optic adjustment unit is used for the beam deflection, the positioning can be implemented in microseconds. This is particularly advantageous in the case of fast optogenetically stimulable processes in living organisms and in the case of manipulations that can be switched by light.

Preferably, such a light source which emits different wavelength ranges or different wavelengths located therein can be combined with the above-described variation of the wavelength.

If the beam path selector in the optical module is exchanged, an optical filter system can likewise be provided for changing filters, preferably in a further plane of the microscope, for example in a detector input coupling plane, wherein the filters are chosen in accordance with the desired illumination and detection wavelengths and the operating state. The detector input coupling plane is the plane to which the detector unit for point and area detection and the at least one light source are able to be coupled. Here, filter wheels or filter interchange systems known from the prior art can likewise be used as a switchover apparatus. The filter interchange system in this plane can choose a filter in accordance with the settings of the beam path selector changing module, particularly preferably in automated fashion and on the basis of the beam path selector changing module, and can introduce said filter into the microscope beam path. Expressed differently, a change in the beam path selector initiates a change of a filter of the filter interchange system of the detector input coupling plane.

Consequently, a means for switching over the operating state of the microscope can be provided in the microscope itself, i.e., in the microscope body, for example. This means can operate in close cooperation with the beam path selector changing module.

In the microscope according to the invention, the area detector is preferably used as a detector for the light sheet mode. If the first microscopy mode is the confocal mode, a point detector can preferably be used for the latter. However, other combinations of the detectors are conceivable, for example the use of the area detector in the confocal mode as well. The detectors can also be used in combination with one another.

In a further configuration, the method according to the invention can be improved by virtue of the fact that a region of interest of the sample volume is identified in the method in the light sheet mode;

following the switchover into the first microscopy mode, the identified region of interest is examined by means of a scanning microscopic method with a higher resolution in comparison with the light sheet mode; and that image data of the light sheet mode and of the first microscopy mode which were generated by the area sensor or a point detector and which represent a light distribution emitted by the sample volume are merged and/or represented together.

The switchover of the operating state of the microscope can be implemented by means of any one of the above-described method steps.

This configuration of the method is advantageous in that an image which provides an overview of the sample can be recorded very quickly within a sample. In the latter, details may not be resolved (as desired). The region of interest can be identified in the recording of the light sheet mode of the microscope. This region of interest is also abbreviated ROI. The ROI can be selected in a suitable manner by the user on a screen by way of a hand gesture controller, a mouth switch, or a foot switch. Thereupon, the operating state of the microscope can be switched over, wherein the preferably scanning method only implements a recording of the ROI, i.e., does not sense/scan the entire region recorded in the light sheet mode.

This configuration of the method can be particularly efficient since both operating states are possible in only one microscope, i.e., both measurements/recordings are possible without changing the microscope or the sample. Further, selecting/choosing the ROI avoids unnecessarily large amounts of data having to be stored which relate to regions which may be of little or no interest to the user for the current examination.

The image data generated in the light sheet mode and in the first microscopy mode can in particular be merged. This should be understood to mean that the generated image data are correlated with one another in particular in view of the relative spatial position in the sample such that, for example, if the ROI is increased precisely the latter can be represented with the higher resolution in this region whereas this resolution may not be ensured in regions outside of the ROI (since the recording in the light sheet mode may offer a lower resolution).

In a further configuration of the method according to the invention, light that differs from the illumination light can be radiated onto or into a sample arranged in the sample volume.

This light additionally radiated-in can be referred to as manipulation light. In accordance with the wavelength of the manipulation light, the latter can consequently either be reflected by the beam path selector and deflected along the first beam path or be transmitted and passed along the second beam path.

If the manipulation light is transmitted through the beam path selector, said manipulation light can irradiate the sample over a large area, i.e., substantially in the form of a light sheet; on account of the different wavelengths, the light sheets formed by the illumination light and the manipulation light may differ slightly in terms of their dimensions.

By contrast, if the manipulation light is reflected, a punctiform irradiation of the sample may be possible. The punctiform irradiation can then be embodied as a line or area. Nevertheless, it is conceivable that a planar irradiation of the sample along the first beam path is also possible in the case of suitable (divergent or convergent) input coupling of the manipulation light.

The irradiation of the sample can be implemented resonantly (at an absorption maximum of the sample) or non-resonantly (away from the absorption maximum of the sample), wherein the first case can be referred to as a manipulation and the second case can be referred to as an excitation of the sample.

The sample can in particular also be irradiated with near infrared light in order to generate a multiphoton excitation in the sample. At the same time, a recording by means of a light sheet can be implemented.

In the case of irradiation with near infrared light, the latter can be reflected to the first optical arrangement at the wavelength-selective optical element. Fluorescence light with a shorter wavelength (e.g., green fluorescence light) can be generated in the sample and can be collected by the first optical arrangement and, furthermore, likewise be reflected at the wavelength-selective element from the first optical arrangement in the direction of the microscope body. At the same time, red or blue light (light at wavelengths perceived or defined as red or blue) can be transmitted through the wavelength-selective optical element in the direction of the second optical arrangement and can form a light sheet (static or virtual light sheet). If the third wavelength-selective optical element is suitably chosen, the latter can reflect the near infrared light, the blue light or the red light but can transmit the spectral range of the fluorescence (green) in the direction of a camera.

The near infrared light can be used to generate multiphoton data records with a point detector unit or non descanning detectors directly via the first optical arrangement (i.e., disposed downstream of the further wavelength-selective optical element). An advantage of such a structure lies in the fact that a switchover is possible without any mechanical movement and hence it is possible to quickly change between a manipulating method and the light sheet mode.

The manipulation light can be coupled into the microscope via a reflected light interface by means of a suitable further wavelength-selective element. In the confocal mode of the microscope, such a further wavelength-selective element can preferably be removed from the beam path and can be replaced by a glass substrate (particularly preferably with an antireflection coating), which reproduces the beam offset of the further wavelength-selective element without having any further (spectral) influence on the beam profile.

In the microscope according to an embodiment of the invention, it is possible to carry out a multiphoton light sheet illumination and, at the same time, an illumination with visible light for the purposes of stimulating a biological event. To this end, illumination light in the visible spectral range (e.g., shorter than 500 nm) can be coupled into the microscope beam path via the further wavelength-selective optical element. By way of a radiant field stop along an axis assigned to the further wavelength-selective optical element it may be possible to set an illuminated area.

The microscope can have an optical interface for connecting a confocal unit. The latter can be formed by a third wavelength-selective optical element, which can guide light either in the direction of the confocal unit or in the direction of a camera. By way of a suitable choice of the third wavelength-selective optical element and the wavelength-selective element in the optical module, it is consequently possible to confocally scan the sample point-by-point by way of the first optical arrangement and to either capture the light in its entirety with the camera, capture said light in its entirety with a point detector unit, or in each case capture some of the light with the camera and with the point detector (with a partial reflector or chromatic filter in the optical interface). The wavelength-selective optical element of the optical module can be configured as a mirror.

Possible manipulation processes include laser ablation, optogenetics, or photoconversion.

The microscope according to the invention and the methods according to the invention consequently allow a sample to be examined using various microscopy methods. In this case, the module according to the invention can be installed and used on the microscope in place of an individual objective, as used in the prior art, for example.

Purely by the use of suitable beam path selectors and the changing of the beam path selector described in a few configurations, it is consequently possible to combine various microscopy methods with one another or carry these out simultaneously. The examinations are implemented in the same sample region and do not require a change of the microscope or a movement of the sample.

In addition to the aforementioned confocal scanning microscopy, further possible microscopy methods include FLIM, FRET, multiphoton microscopy or localization microscopy (PALM/STORM and congeneric methods).

In particular, the optical module according to the invention can convert a commercial, preferably upright confocal scanning microscope into a light sheet-capable microscope.

Such a conversion firstly saves the space required for a further microscope and, moreover, can be more cost-effective than a complete light sheet microscope. In particular, the costs of the optical module required for the necessary reconstruction can be of the order of the costs of a new objective.

By using the optical module according to the invention, an already available confocal microscope can consequently be converted into a versatile microscope with a multiplicity of operating states or modes of operation.

In a further configuration of the microscope according to the invention, the microscope beam path can be able to be fed into the optical module in a manner tilted to a normal perpendicular to the back focal plane of the first and/or second optical arrangement, wherein the second optical arrangement and/or the attachment element can be able to be tilted depending on the tilt of the microscope beam path with respect to the normal of the back focal plane of the second optical arrangement.

With this configuration of the microscope according to the invention, it is possible to ensure that light which is substantially transmitted through the beam path selector, i.e., extends along the second optical beam path, does not reach the field of view of the camera (2-D detector) via the first optical beam path.

If wavelength-selective elements in the form of dichroic beam splitters or dichroic mirrors are used as beam path selectors, these can only ensure a 99.0% to 99.9% suppression of unwanted reflections as a result of their coatings. That is to say that 0.1% to 1.0% of the radiated-in illumination light which should propagate along the second beam path may be reflected into the first beam path. This light unintentionally steered in the direction of the first optical arrangement, i.e., a component of the illumination light, is focused in the sample thereby and can for example generate fluorescence in the sample, be superimposed on the fluorescence excited by means of the light sheet and supply unwanted artifacts.

Therefore, the illumination light is radiated into the optical module with such a tilt that the component of the illumination light reflected at the beam path selector is not focused within a field of view in the sample by the first optical arrangement. Expressed differently, this component is located outside of an acceptance angle of the first optical arrangement and is consequently not imaged by the latter.

However, the tilt of the microscope beam path also influences the second beam path such that, preferably, the second optical arrangement and/or the attachment element can be tilted in such a way that the first optical axis and the second optical axis intersect in the sample volume again in a manner substantially perpendicular to one another.

In a further configuration of the microscope according to the invention, a stop filter for attenuating or blocking a reflected component of the second spectral range (i.e., the illumination light) which is substantially transmitted to the second optical arrangement by the wavelength-selective optical element and/or a further optical arrangement for displacing the back focal plane of the first optical arrangement can be provided in the first beam path.

A stop filter can be a simple alternative to the aforementioned tilt of the microscope beam path. The stop filter can ideally completely block the illumination light or else at least attenuate the latter in such a way that the component of the illumination light, only amounting to 0.1% to 1.0% in any case, cannot generate any detectable fluorescence following the attenuation.

To prevent possible vignetting, the further optical arrangement can be used to displace the back focal plane of the first optical arrangement. This preferably afocal optical unit can displace a plane of an envisaged tilt axis into the actual back focal plane of the first optical arrangement.

This configuration can prevent the tilt of the beam not occurring about a plane located in the back focal plane of the optical arrangement. If this would be the case, points located at the edge of the field of view could not be imaged completely and shadowing (vignetting) would occur.

As an alternative to the use of the afocal optical unit, it is possible to use a scanner configuration known from the prior art, said scanner configuration having two mirrors which are tiltable about parallel axes of rotation but which are tilted through different angles. From the spacing of the mirrors and the two deflection angles of the mirrors, it is possible in such a case to determine the position of the tilt plane, i.e., the plane in which the tilt axis is located.

A scanning unit or scanner in a confocal microscope can consist of three scanning devices. Two of these can deflect in the Y-direction and one in the X-direction. The two mirrors deflecting in the Y-direction can steer the tilt axis on the mirror deflecting in the X-direction such that the tilt axis both in the X-direction and in the Y-direction are located in the same plane, as in the case of a gimbal-mounted mirror.

For the light sheet module, there can preferably be a tilt with two mirrors into a direction perpendicular to the light sheet plane. The scanning movement to generate the light sheet (virtual light sheet) can be implemented using a single mirror which can allow a faster scanning movement. A tilt by way of the Y-scanners and a displacement of the tilt axis into the back focal plane of an optical arrangement (e.g., the second optical arrangement) can ensure that the light sheet is not tilted in relation to the focal plane of the first optical arrangement. This can avoid out-of-focus imaging of the image in the edge regions.

The microscope according to the invention can be further improved by virtue of at least one element from the following list of elements, comprising the first optical arrangement;
the second optical arrangement;
the beam path selector; and
the stop filter,
being received in repeatedly interchangeable fashion when the module is attached to the receiving apparatus.

Preferably, a plurality of the aforementioned elements can be interchangeable together such that a corresponding operating state can be selected.

The microscope can comprise a further imaging beam path which has a further microscope objective and a further detector, wherein the sample volume is able to be imaged on the further detector by the objective of the further imaging beam path from a side which faces away from the optical module.

The further imaging beam path of the microscope can be movable relative to the optical module. Likewise, the first optical arrangement can alternatively be movable relative to the second optical arrangement.

In addition to the attachment element arranged between the first optical arrangement or the second optical arrangement and the sample volume, a further attachment element can be arranged between the respective other optical arrangement and the sample volume.

The optical axis of the microscope beam path and the optical axis of the first optical arrangement and/or the optical axis of the second optical arrangement and/or the optical axis of the optional further imaging beam path can intersect a common object field.

The first optical arrangement and/or the second optical arrangement and/or optionally the further imaging beam path can have a variable lens or a variably adjustable liquid lens or a zoom optical unit.

In a further configuration of the microscope, a dynamic light sheet can be generable using a scanner.

It is further conceivable that a static light sheet is generable using a cylindrical lens.

In a further configuration of the microscope, the first optical arrangement and/or the second optical arrangement can have a microscope objective with finite optics or infinite optics.

Even though some aspects were described within the scope of an apparatus, it is clear that these aspects also represent a description of the corresponding method, with an apparatus corresponding to a method step or a function of a method step. Analogously, aspects described within the scope of a method step also represent a description of a corresponding element or a property of a corresponding apparatus. Some or all method steps can be carried out by (or using) a hardware apparatus, as might be, for example, a processor, a microprocessor, a programmable computer, or an electronic circuit. In some exemplary embodiments, one or more of the most important method steps can be carried out by such an apparatus.

Depending on certain implementation requirements, exemplary embodiments of the invention can be implemented in hardware or software. The implementation can be carried out using a nonvolatile storage medium such as a digital storage medium, for example a disk, a DVD, a Blu-ray, a CD, a ROM, a PROM and EPROM, an EEPROM, or a flash memory, on which electronically readable control signals are stored, which interact (or are able to interact) with a programmable computer system in such a way that the respective method is carried out. Therefore, the digital storage medium can be computer-readable.

Some exemplary embodiments according to the invention comprise a data medium with electronically readable control signals which can interact with a programmable computer system in such a way that one of the methods described herein is carried out.

In general, exemplary embodiments of the present invention can be implemented as a computer program product with a program code, wherein the program code is effective for carrying out one of the methods when the computer program product runs in a computer. By way of example, the program code can be stored on a machine-readable medium.

Further exemplary embodiments comprise the computer program for carrying out one of the methods described herein, which computer program is stored on a machine-readable medium.

Expressed differently, one exemplary embodiment of the present invention therefore is a computer program with a program code for carrying out one of the methods described herein when the computer program runs in a computer.

A further exemplary embodiment of the present invention therefore is a storage medium (or data medium or computer-readable medium), which comprises a computer program stored thereon for carrying out one of the methods described herein when it is executed by a processor. As a rule, the data medium, the digital storage medium or the recorded medium are tangible and/or not seamless. A further exemplary embodiment of the present invention is an apparatus as described herein, which comprises a processor and the storage medium.

A further exemplary embodiment of the invention is therefore a data stream or a signal sequence constituting the computer program for carrying out one of the methods described herein. The data stream or the signal sequence can be configured for example so as to be transmitted via a data communications connection, for example via the Internet.

A further exemplary embodiment comprises a processing means, for example a computer or a programmable logic device, which is configured or adapted to carry out one of the methods described herein.

A further exemplary embodiment comprises a computer on which the computer program for carrying out one of the methods described herein is installed.

A further exemplary embodiment according to the invention comprises an apparatus or a system configured to transmit (for example electronically or optically) a computer program for carrying out one of the methods described herein to a receiver. The receiver can be for example a computer, a mobile apparatus, a storage apparatus, or the like. The apparatus or the system can comprise for example a file server for transmitting the computer program to the receiver.

In some exemplary embodiments, a programmable logic device (e.g., a field programmable gate array, FPGA) can be used to implement some or all of the functionalities of the methods described herein. In some exemplary embodiments, a field programmable gate array can cooperate with a microprocessor in order to carry out one of the methods described herein. In general, the methods are preferably carried out by any hardware device.

Below, embodiments of the present invention are explained in more detail on the basis of appended figures. These figures show purely exemplary configurations of the microscope according to the invention and associated methods according to the invention. The technical features shown in the individual configurations are combinable with one another as desired and can also be omitted if they are not required for a specific configuration.

FIG. 1 shows a microscope 1, which is a confocal microscope 4 that has been converted into a light sheet microscope 3. The microscope 1 comprises a microscope body 5 and a mechanical receiving apparatus 7 for microscope objectives 37, through which a microscope beam path 9 extends. An optical module 11 for illuminating a sample volume 13 and for collecting and transmitting light 15 from the sample volume 13 is attached to the receiving apparatus 7. The sample volume 13 is arranged on a sample stage 67.

The optical module 11 comprises a first optical arrangement 17 with a first beam path 19, a second optical arrangement 21 with a second beam path 23, and an optical beam path selector 25, which combines the first beam path 19 and/or the second beam path 23 with the microscope beam path 9.

The optical beam path selector 25 is configured as wavelength-selective optical element 39. In particular, this is a dichroic mirror 41.

The second optical arrangement 21 is merely illustrated as a single lens in FIG. 1; however, it can be a microscope objective 37 like the first optical arrangement 17. In particular, the second optical arrangement 21 can be a light sheet module 43 for generating a light sheet 45 that passes through the sample volume 13.

The microscope 1 further comprises a light source 47, a beam splitter 49, a scanner 51, and a point detector unit 53, which are all arranged in a confocal module 55.

In addition to the wavelength-selective optical element 39 of the optical module 11, a further wavelength-selective optical element 57, which is likewise a beam splitter 49, is provided. By way of the latter, manipulation light 59 can be coupled into the microscope beam path 9. Further, a stop filter 35 is shown, the functionality of which is described in FIG. 6.

Further, provision is made of a third wavelength-selective optical element 61 (likewise a beam splitter 49), which represents an optical interface 63, by means of which the confocal module 55 (also referred to as confocal unit or scanning unit in the case of multiphoton excitation) and/or a camera 65 can be connected to the microscope beam path 9. By way of a suitable choice of the third wavelength-selective optical element 61, it is possible to irradiate both the confocal module 55 and the camera 65 simultaneously with light 15 at the appropriate wavelength such that a plurality of measurements of the sample 69 can be carried out at the same time.

Figure 2:
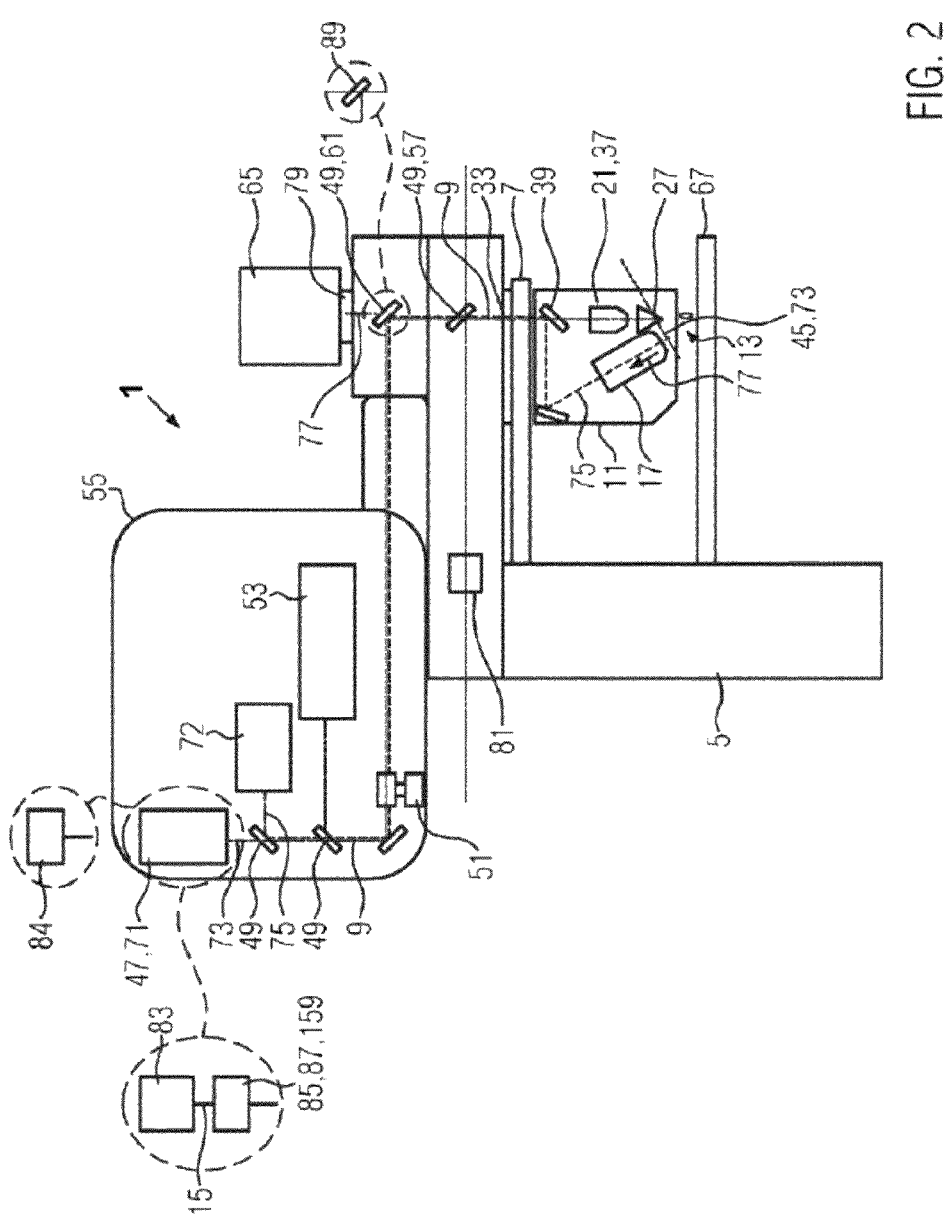
FIG. 2 shows a schematic structure of a further configuration of the microscope according to an embodiment of the invention.

FIG. 2 shows a further configuration of the microscope 1 according to the invention, which has a near infrared light source 72 in the confocal module 55 in addition to the light source 47, which is a light source of visible light 71 in this shown configuration. The near infrared light source 72 is also coupled into the microscope beam path 9 by means of a beam splitter 49. The scanner 51 consequently equally deflects visible light 73 and near infrared light 75. In a confocal mode, scanning mode or operating state of the microscope 1, this allows a multiphoton excitation to be carried out in the same region of the sample volume 13 where the visible light 73 is also radiated in for illumination purposes.

In the optical module 11, the near infrared light 75 is reflected by the wavelength-selective optical element 39 to the first optical arrangement 17 in the configuration shown. The visible light 73, for example blue light, is transmitted through the wavelength-selective optical element 39 and reaches the second optical arrangement 21, which is represented here as a microscope objective 37. Consequently, the light sheet 45 is formed by the visible light 73, whereas the near infrared light 75 is focused by the first optical arrangement 17.

By way of the near infrared light 75, fluorescence can be excited in the sample volume 13 and fluorescence light 77 can be emitted, the latter being collected by the first optical arrangement 17 and reflected by the wavelength-selective optical element 39.

The third wavelength-selective optical element 61 is transparent to the fluorescence light 77, and so the latter can be detected by the camera 65. The camera is fastened to the tube by means of an interface for tubes 79 at the microscope 1; alternatively, the tube can be replaced by a tube lens with a camera adapter.

Consequently, the near infrared light 75 can serve to generate multiphoton data records, which were captured by the point detector unit 53. Alternatively, use can be made of non descanning detectors 81 (abbreviated NDD), which receive the fluorescence light 77 via the further wavelength-selective optical element 57. The NDDs 81 are merely plotted schematically.

In a further configuration, the light source 47 can be a broadband light source 83. This is illustrated in a circle above the microscope 1.

This broadband light source 83 can transmit emitted light 15 through a wavelength-changing element 85. The wavelength-changing element 85 consequently represents a switchover apparatus 159 and can be an acousto-optic transmission filter (AOTF) 87 in the example shown. The latter can be used to select the wavelength of the light 15, and so the light can be guided either to the first optical arrangement 17 or to the second optical arrangement 21 at the wavelength-selective element 39 in the optical module 11 purely by setting the wavelength-changing element 85. A frequency of the switchover of the wavelength-changing element 85 can determine a possible frame rate for images to be recorded in this case; a switchover of optical components is not necessary. In such a configuration, the 2 wavelength selective optical element 61 can be replaced by a neutral intensity splitter 89, which reflects 50% of the incident light and transmits 50%. The use of a wavelength-changeable light source 84 (which represents a switchover apparatus 159) is likewise possible.

The shown structure facilitates a plurality of combinations of illumination and stimulation. Examples include a near infrared multiphoton light sheet illumination and, at the same time, an areal illumination with visible light 73, or a light sheet illumination with visible light 73 in combination with the stimulation/excitation of the sample 69 by means of visible light 73 (at a different wavelength) by way of the first optical arrangement 17.

Figure 3:
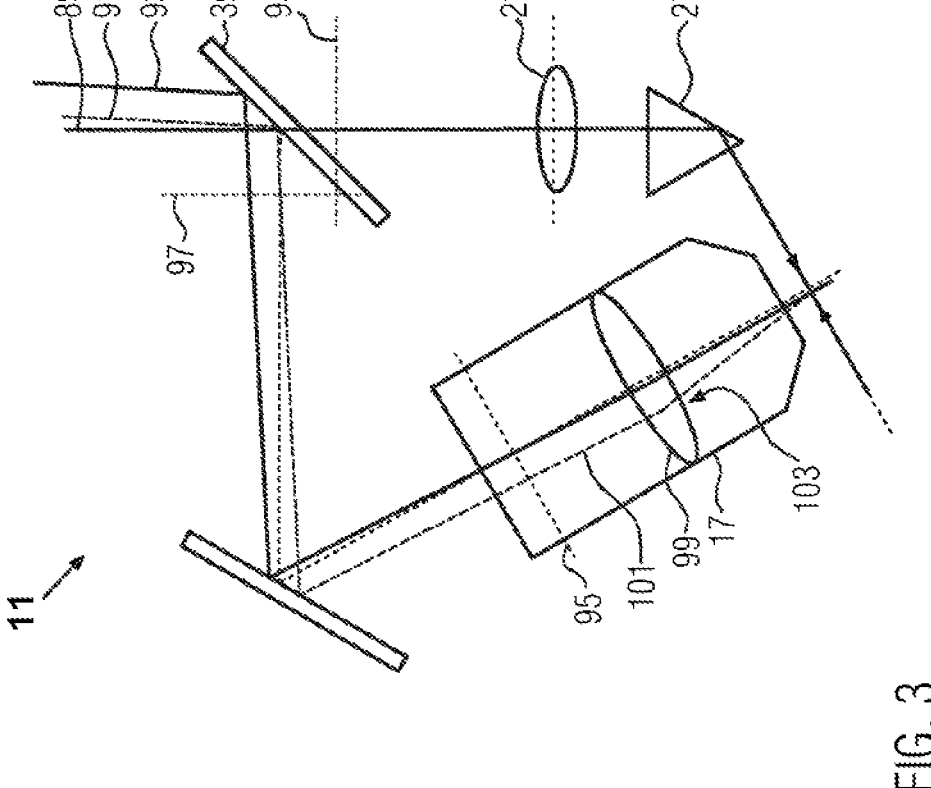
FIG. 3 shows a schematic illustration of the optical module according to an embodiment of the invention for avoiding vignetting on account of a displaced entry pupil.

FIG. 3 shows the optical module 11, wherein an illumination beam of the light sheet 89, a confocal illumination beam 91, and a confocal illumination beam with a displaced tilt plane 93 are shown; further shown are back focal planes 95 of the first 17 and also the second optical arrangement 21.

It is possible to identify that, in the case of a tilted confocal illumination beam 91, the tilt is implemented about a tilt plane 97 and not about the back focal plane 95 of the first optical arrangement 17. In the optical units 99, this leads to illumination light 101 being guided in edge regions 103 of the optical units 99. This can lead to shadowing in the edge regions 103, so-called vignetting.

Figure 5:
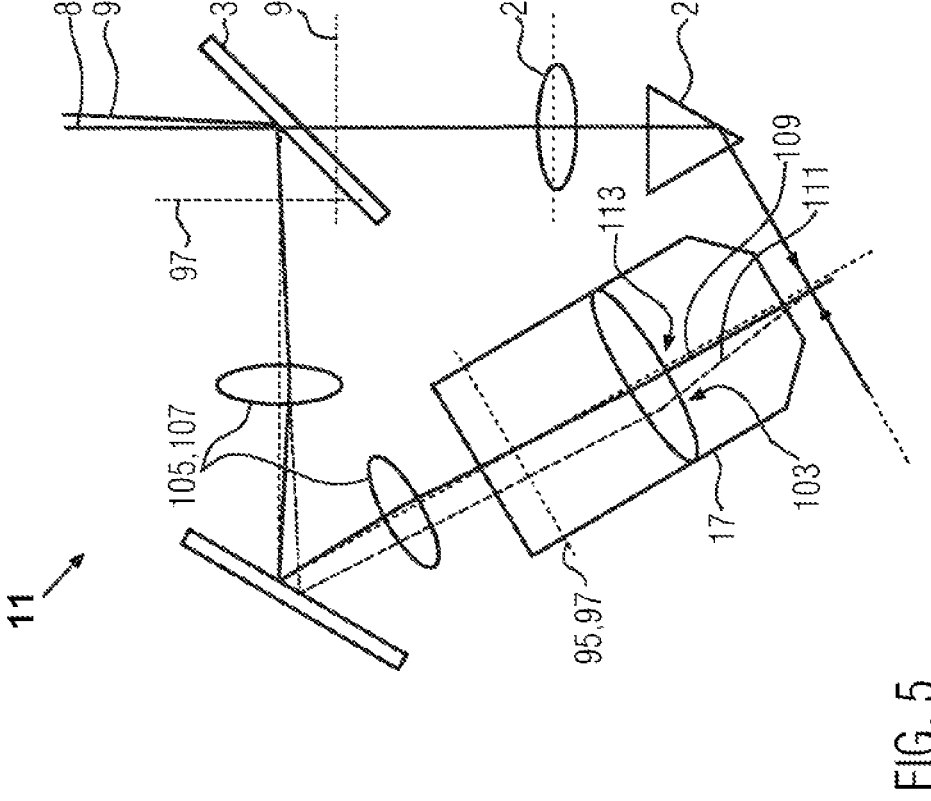
FIG. 5 shows a schematic illustration of a further configuration of the optical module according to an embodiment of the invention for avoiding vignetting on account of a displaced entry pupil.

This imaging aberration in the case of tilted incoming radiation of the illumination light 101 can be avoided by way of a further optical unit 105, in particular an afocal optical unit 107. This is illustrated in FIG. 5.

In this case, too, the confocal illumination beam 91 is tilted; however, it is deflected by the further optical unit 105/the afocal optical unit 107 in such a way that the confocal illumination beam 91 is tilted about the back focal plane 95 of the first optical arrangement 17. The back focal plane 95 is thus the tilt plane 97. The original beam path of the confocal illumination beam 91 is plotted using dashed lines.

In contrast to the uncorrected confocal illumination beam 111, the corrected confocal illumination beam 109 is no longer guided through the edge regions 103 but in the region 113 close to the axis. Vignetting is therefore reduced or even entirely avoided.

Figure 4:
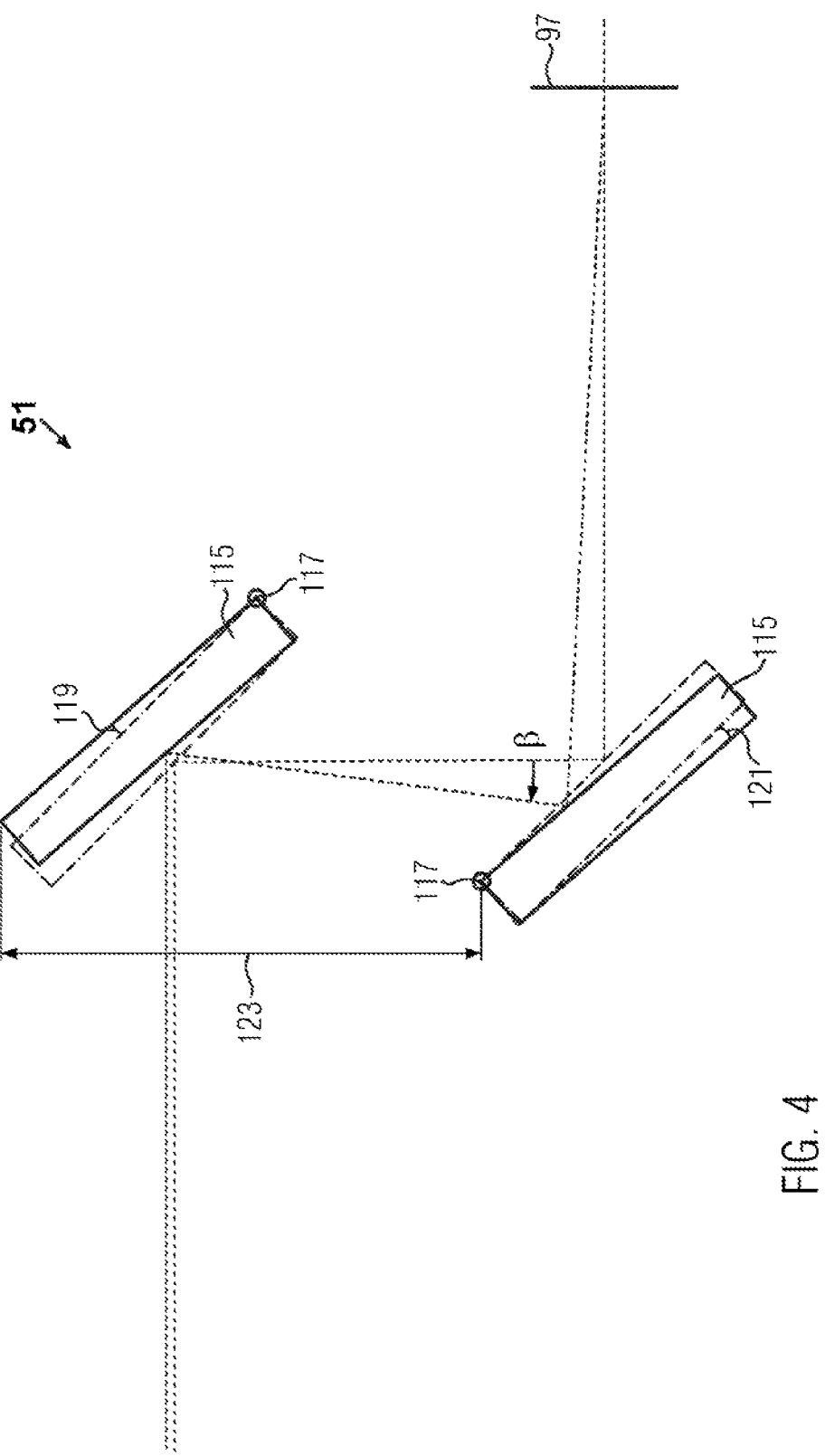
FIG. 4 shows a schematic illustration of a scanning unit with a freely adjustable plane in which the tilt axis of the beam is located.

FIG. 4 shows a scanner 51, in which two mirrors 115 can be tilted about parallel axes of rotation 117. However, a first mirror 115a is tilted through a first angle 119 and a second mirror 115b is tilted through a second angle 121. The first angle 119 and the second angle 121 differ from one another, and so the position of the tilt plane 97 can be set in combination with a distance 123 between the mirrors 115. This method is also known as beam walking.

Figure 6A:
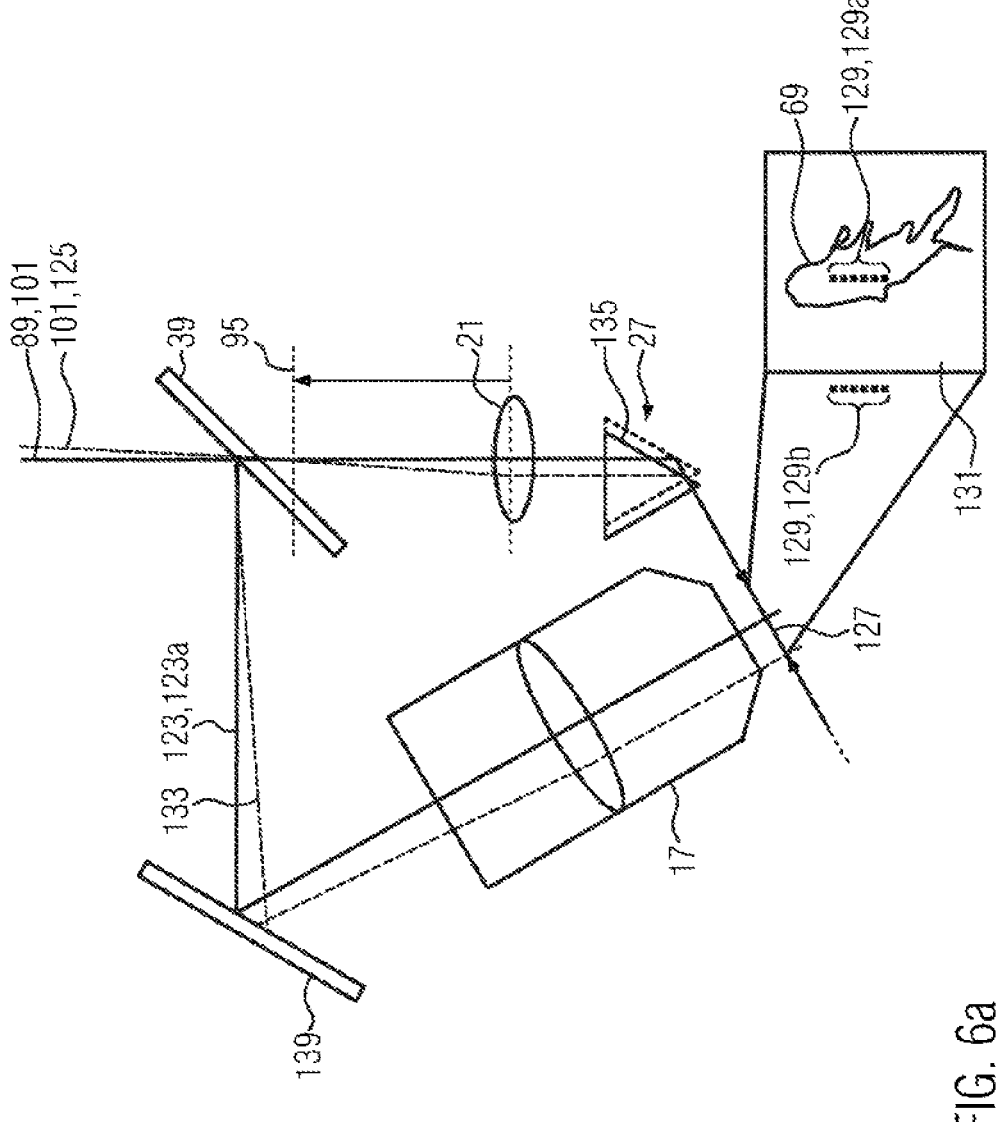
FIG. 6a shows a schematic illustration of a further configuration of the optical module according to an embodiment of the invention for avoiding unwanted reflections.

FIG. 6a shows the optical module 11, wherein the illumination beam of the light sheet 89 and a tilted illumination beam of the light sheet 125 are shown. If illumination light 101 should now be transmitted through the wavelength-selective optical element 39 along the illumination beam of the light sheet 89, there can be an unwanted reflection at said optical element, and so a component of illumination light 123 is reflected in the direction of the first optical arrangement 17. This component 123 can make up 0.1% to 1.0% (this component may also be more than 1% depending on the specification of the filter companies) of the illumination light 101 originally radiated in.

If the illumination is implemented along the illumination beam of the light sheet 89, the component of illumination light 123, this component 123 is referred to below as first component 123a for distinguishing purposes, is focused into a field of view 127 of the first optical arrangement 17 by the first optical arrangement 17 and can lead to bothersome artifacts 129 in image data 131 of the sample 69. For distinguishing purposes, these artifacts 129 are referred to as first artifacts 129a below.

However, if the illumination light 101 is radiated in along the tilted illumination beam of the light sheet 125, a second reflected component 133 nevertheless occurs but the latter is incident outside of the field of view 127 following the passage through the first optical arrangement 17. That is to say, this second reflected component 133 does not reach the sample 69 within the field of view 127. These artifacts 129, referred to as second artifacts 129b for distinguishing purposes, are consequently not situated in the image data 131.

The relative position of the first optical arrangement 17 is not altered during the introduced tilt of the illumination beam 89. However, since the first beam path 19 and the second beam path 23 should be perpendicular to one another for a light sheet recording, the attachment element 27 is displaced laterally. This is illustrated schematically by dashed lines.

The attachment element 27 indicated by a full line denotes a relative position 135 for the tilted illumination beam of the light sheet 125. By contrast, an optimal relative position 137 for the non-tilted illumination beam of the light sheet 89 is indicated by a dashed line.

Figures 6B, 7, 8:
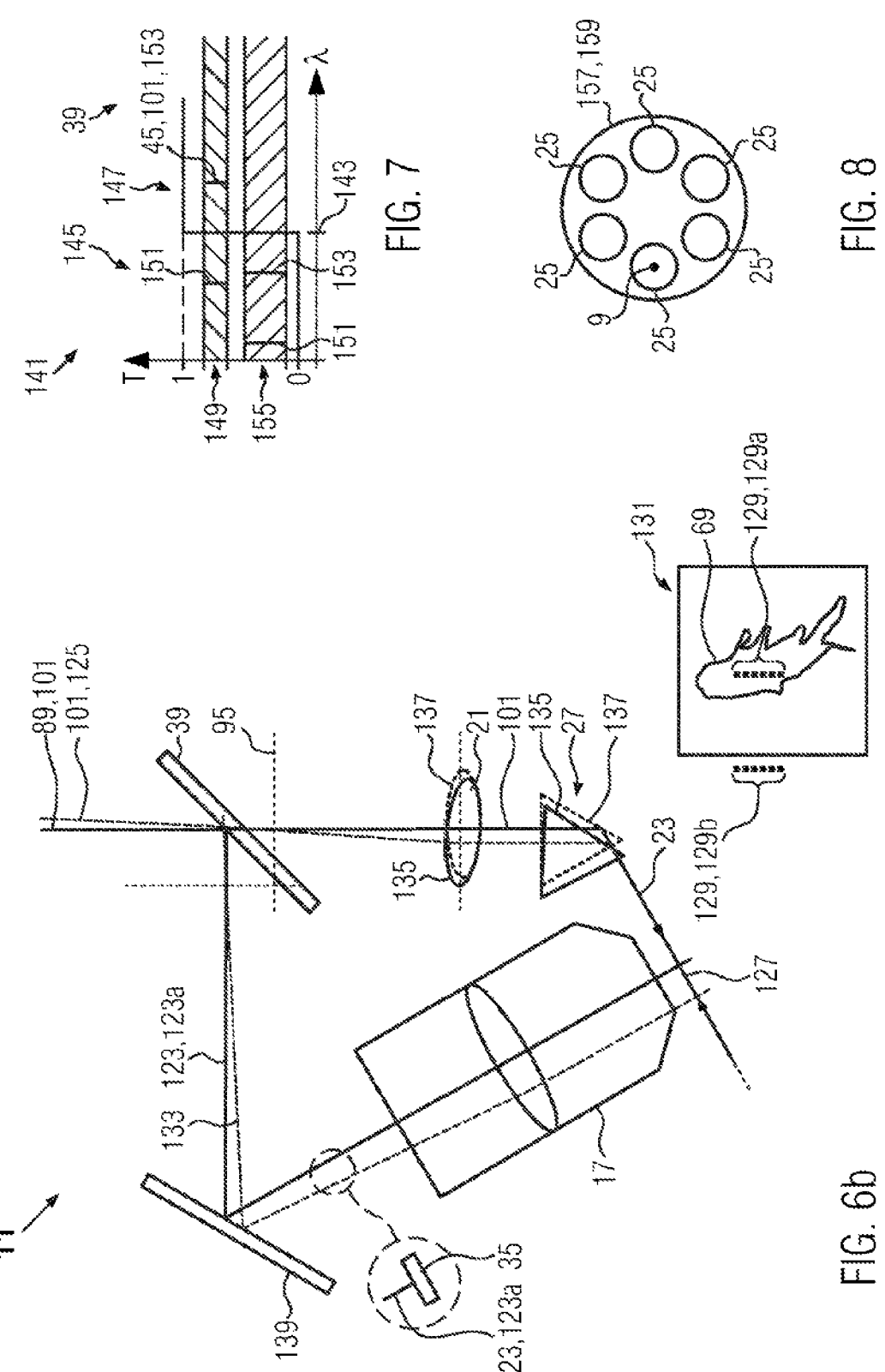
FIG. 6b shows a schematic illustration of a further configuration of the optical module according to an embodiment of the invention for avoiding unwanted reflections.
FIG. 7 shows a schematic illustration of a transmission characteristic of the wavelength-selective optical element.
FIG. 8 shows a beam path selector changing module with a multiplicity of beam path selectors.

To avoid transverse chromatic aberrations of the illumination objective when tilting the illumination beam, a further alternative is described here with reference to the attached FIG. 6*b:*

Transverse chromatic aberrations may occur if the second optical arrangement 21 is illuminated in tilted fashion far away from the image center. If different illumination wavelengths are used, this then appears as a focal offset in the illumination plane (different planes are illuminated). To avoid this, the second optical arrangement 21 with the attachment element 27 is likewise tilted through this angle (for example 1°-8°) in the case of a tilted illumination beam of the light sheet 125. Firstly, this can avoid imaging aberrations in the form of transverse chromatic aberrations and secondly this can ensure that the first beam path 19 and the second beam path 23 are perpendicular to one another for the light sheet recording. Consequently, the detection objective 17 need not be tilted accordingly.

The second optical arrangement 21 and the attachment element 27 labeled by the full line label the relative position 135 for the tilted illumination beam of the light sheet 125; the optimal relative position 137 for the non-tilted illumination beam of the light sheet 89 is indicated using dashed lines.

FIG. 6*b* also shows the second artifacts 129*b*, which have arisen as a result of the second reflected component 133 passing through the first optical arrangement 17. However, these second artifacts 129*b* are located outside of the field of view 127 and are consequently not situated in the image data 131. Further, the first artifacts 129*a*, which occur in the image data 131 for the illumination beam of the light sheet 89 when use is not made of a stop filter 35 described below, are also shown.

Alternatively, the unwanted reflection described here can be avoided by virtue of the aforementioned stop filter 35 being introduced between the wavelength-selective optical element 39 and the first optical arrangement 17. Preferably, the stop filter 35 is situated between a deflection mirror 139 and the first optical arrangement 17. The stop filter 35 blocks the component of illumination light 123 such that it cannot form bothersome artifacts 129 in the image data 131.

FIG. 7 shows a transmission characteristic of the wavelength-selective optical element 39. Plotted here is the transmission T against wavelength λ, with the transmission T ideally being zero in a first spectral range 145 and increasing to one at a filter edge 143, i.e., in a second spectral range 147. In the ideal case, the reflection characteristic R can be obtained from the transmission characteristic 141 by way of the formula T+R=1.

In a light sheet mode 149, illustrated schematically by horizontal hatching, a first wavelength 151 is located in the first spectral range 145 and a second wavelength 153 is located in the second spectral range 147, and so light 15 at the first wavelength 151 is reflected at the wavelength-selective optical element 39 (transmission T is zero) while light 15 at the second wavelength 153 is transmitted. The light 15 at the second wavelength 153 can consequently represent illumination light 101 for the light sheet 45.

In the case of a first microscopy mode 155—the latter is likewise represented by a hatched region—both the first wavelength 151 and the second wavelength 153 are situated in the first spectral range 145.

Consequently, a switchover between the light sheet mode 149 and the first microscopy mode 155 can be implemented by virtue of (a) the relative position of the filter edge 143 being varied or (b) at least one wavelength being displaced beyond the filter edge 143 into the same spectral range of the further wavelength.

A procedure as per (a) can be realized by virtue of the wavelength-selective optical element 39 being interchanged. By way of example, this can be implemented by means of a switchover apparatus 159 configured as a beam path selector changing module 157 shown in FIG. 8, which, in the case shown, can alternately introduce different beam path selectors 25 into the microscope beam path 9.

In the case of a procedure as per (b), use can be made of the wavelength-changing element 85 shown in FIG. 2, for example in order to displace the second wavelength 153 into the first spectral range 145.

Figure 9:
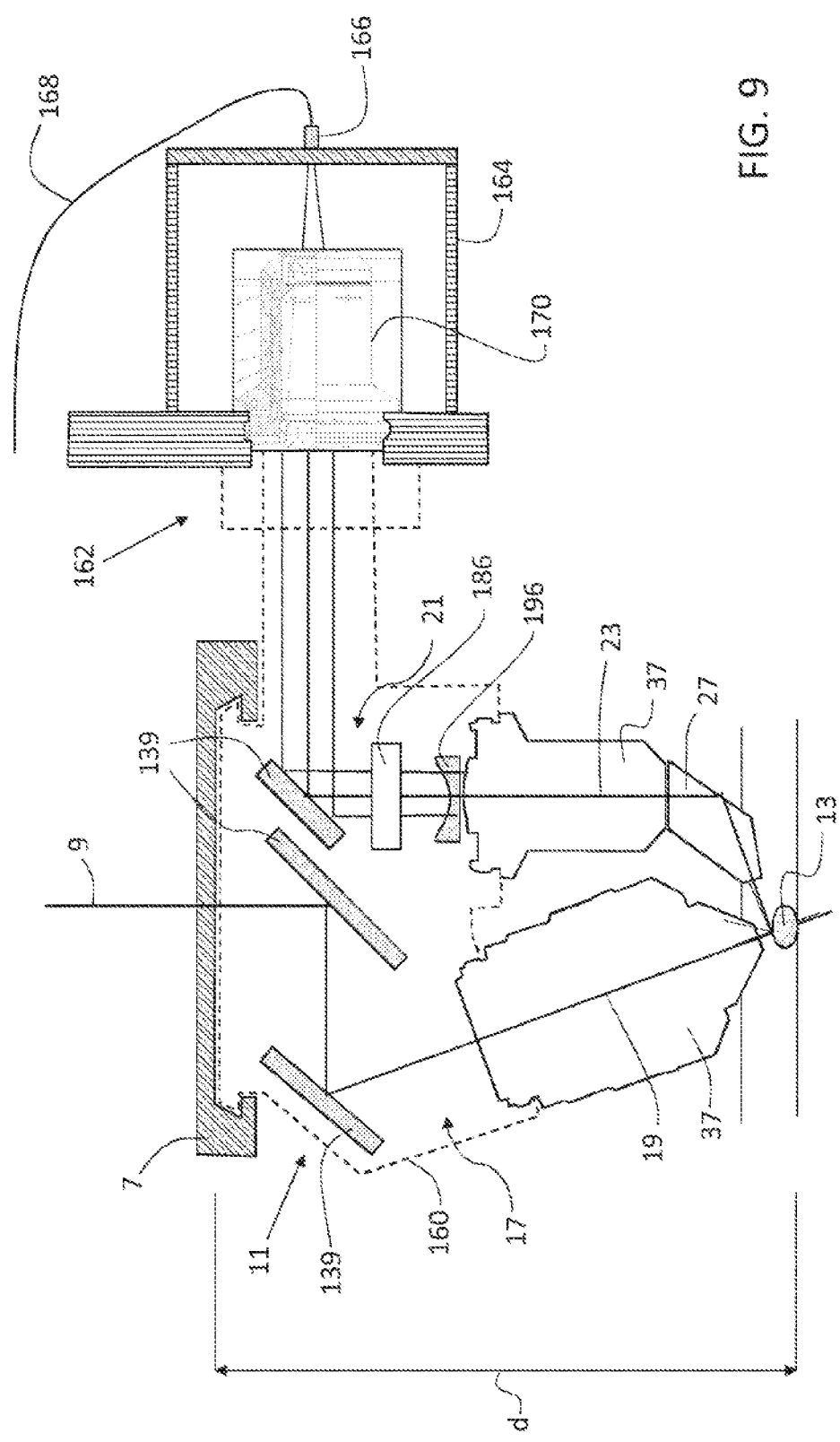
FIG. 9 shows a schematic view of a further exemplary embodiment of an optical module.

FIG. 9 shows a further exemplary embodiment of an optical module 11, which is adapted to a mechanical receiving device 7 of a microscope or a microscope body with a microscope beam path 9. This optical module 11 has a housing 160, in which the first optical arrangement 17 with the first beam path 19 and the second optical arrangement 21 with the second beam path 23 that intersects the first beam path 19 in the sample volume 13 are arranged. An attachment element 27 is arranged between the second optical arrangement 21 and the sample volume 13, the second beam path 23 extending through the attachment element 27. With the aid of the cylindrical lens 196, a static light sheet can be generated with the second optical arrangement 21.

An input coupling site 162, via which illumination light for illuminating some of the sample volume 13 via the second beam path 23 is implemented, is provided at the housing 160 of the optical module 11. Thus, the illumination light could firstly be input coupled in collimated fashion into the second beam path 23 as a freely propagating light beam, with in this case the input coupling site being embodied, for example, in the form of a passage in the housing 160 of the optical module 11. In the specific case, a housing part 164, on which a fiber coupler 166 of an optical fiber 168 is arranged, is arranged at the input coupling site 162. Illumination light from a light source is coupled into the second beam path 23 via the optical fiber 168. To this end, provision is made of a collimation optical unit, by means of which the illumination light emerging in divergent fashion from the fiber coupler is collimated.

Figure 10:
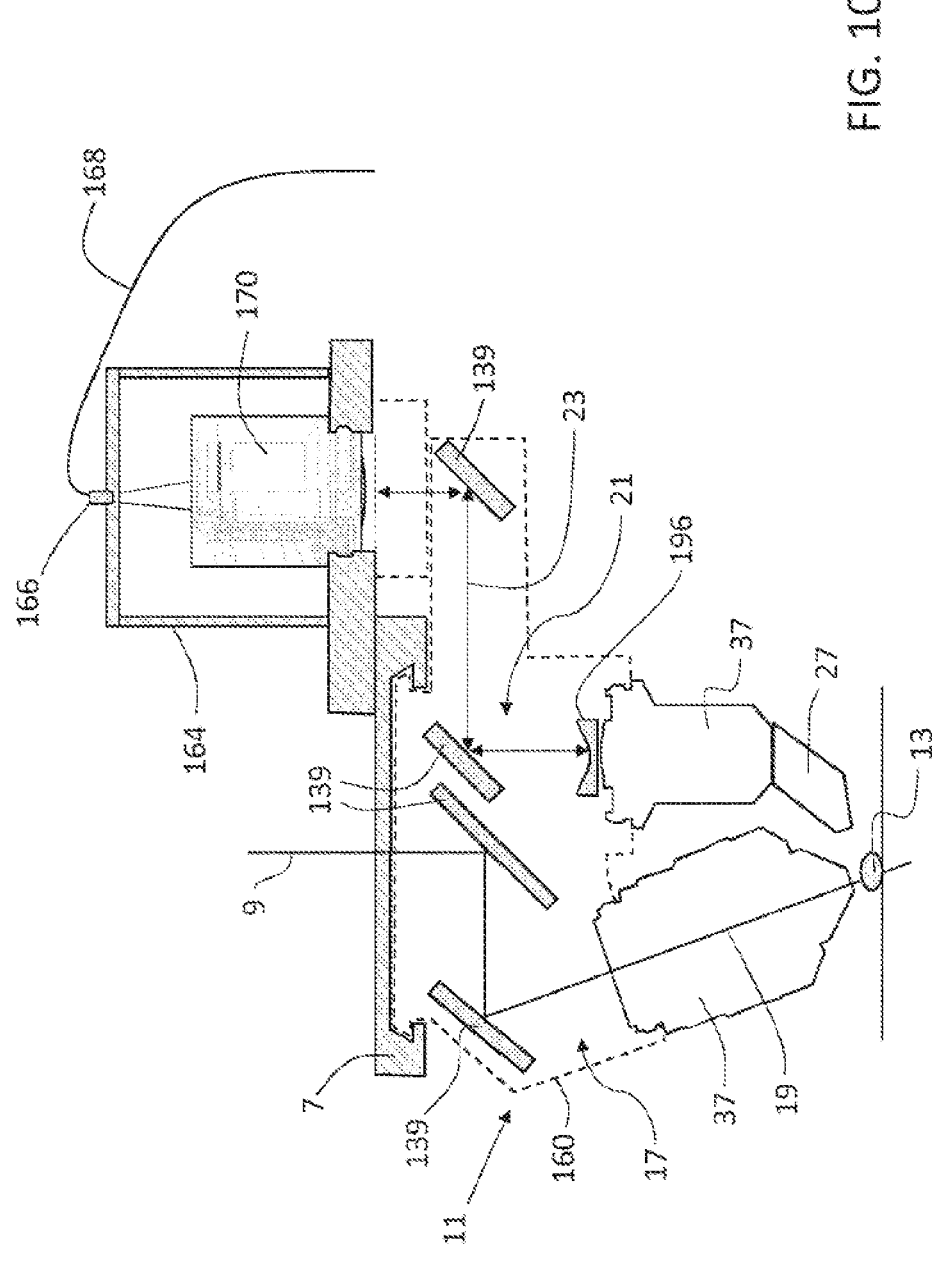
FIG. 10 shows a schematic view of a further exemplary embodiment of an optical module.

FIG. 10 shows a further exemplary embodiment, in which the housing part 164 is arranged from above or at a different side of the housing 160 of the optical module 11, as a result of which a further deflection mirror 139 disposed downstream of the collimation optical unit 170 becomes necessary but different requirements in respect of the external installation space can be satisfied than in the case of the exemplary embodiment of FIG. 9.

Figure 11:
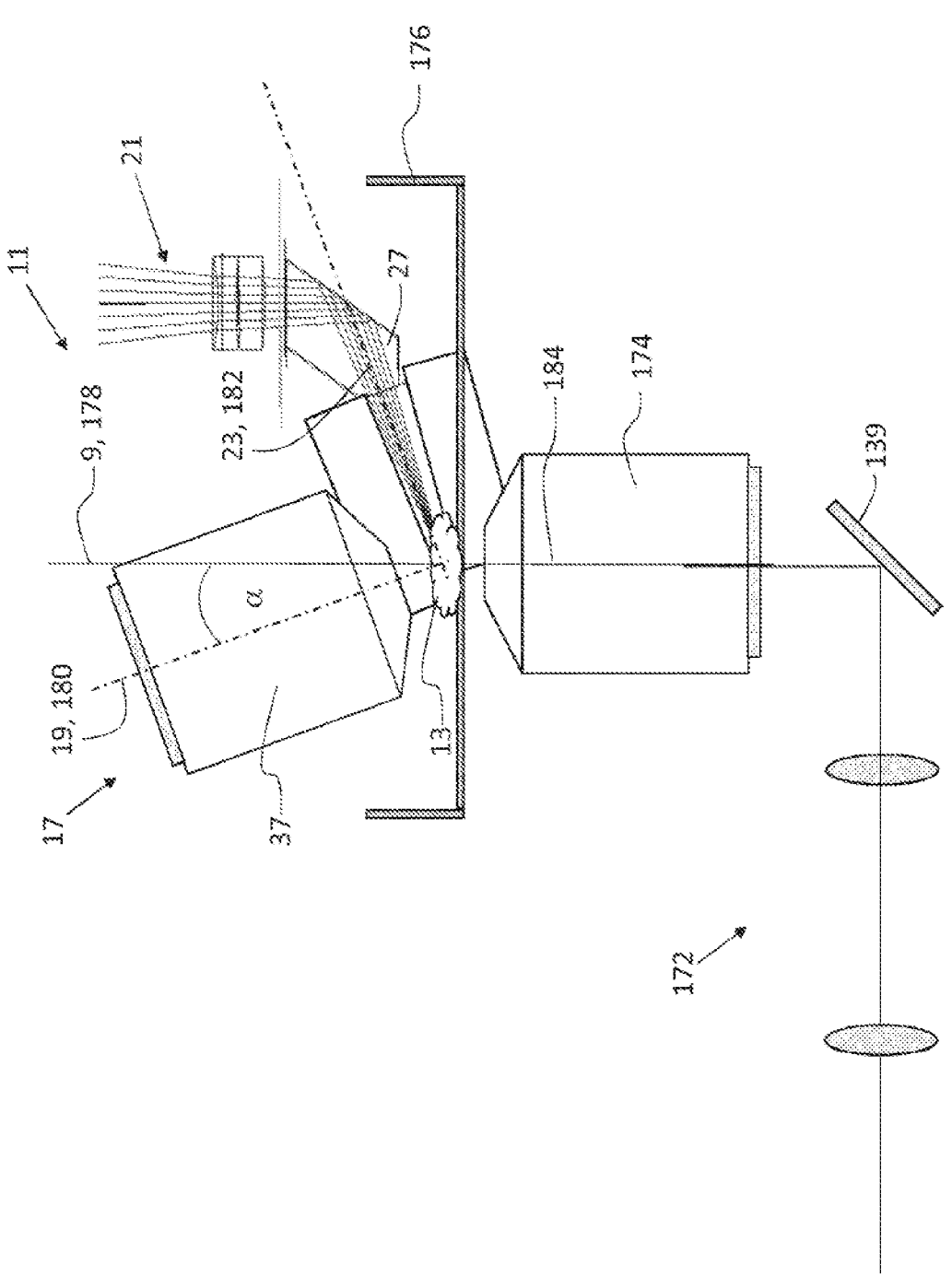
FIG. 11 shows a schematic view of a further exemplary embodiment of an optical module with a further imaging beam path.

FIG. 11 shows a further exemplary embodiment, in which a further imaging beam path 172 is provided. The further imaging beam path 172 has a microscope objective 174 and a further detector, which could be arranged, for example, below the beam splitter in the form of a suitably embodied dichroic beam splitter 139. Using the objective 174 of the further imaging beam path 172, the sample volume 13 can be imaged on the further detector from a side which faces away from the optical module 11. In other words, the same object or sample volume 13 can be imaged with the further imaging beam path 172 from the lower side of the sample container 176 plotted in exemplary fashion in FIG. 11, whereas the sample volume 13 can be imaged from the top in relation to the sample container 176 when using the optical module 11. This is possible at the same time or successively in time. It is also possible to manipulate the object in the sample volume by way of the further imaging beam path 172 in targeted fashion, for example by means of pulsed or continuous light with a suitable wavelength, intensity, and/or beam profile. In this respect, provision can also be made for the further imaging beam path 172 to only serve for object manipulation.

In a preferred embodiment, the further imaging beam path 172 is arranged in movable fashion relative to the optical module 11. As an alternative or in addition thereto, the first optical arrangement 17 can be arranged in movable fashion relative to the second optical arrangement 21, for example in a substantially horizontal direction in FIG. 9.

In addition to the attachment element 27 arranged between the first optical arrangement 17 or the second optical arrangement 21 and the sample volume 13, a further attachment element could preferably be arranged between the respective other optical arrangement 21, 17 and the sample volume 13. Consequently, it is also possible to alter the angle α between the optical axis 180 of the microscope objective 37 of the first beam path 19 of the first optical arrangement 17 and the optical axis 182 of the second beam path 23 (downstream of the attachment element 27) of the second optical arrangement 21, and in particular reduce said angle or even set an angle of substantially zero degrees, for example if the further attachment element is embodied within the meaning of a deflection element which accordingly deflects the optical axis of the first beam path 19 of the first optical arrangement 17.

Very particularly preferably, the optical axis 178 of the microscope beam path 9 and the optical axis 180 of the first optical arrangement 17 and/or the optical axis 182 of the second optical arrangement 21 and/or the optical axis 184 of the optional further imaging beam path 172 intersect a common object field or a common region in the sample volume 13, as indicated in FIG. 11, for example. In this context, the common object field should be understood to be, in particular, the region of the microscope objective 37 of the first optical arrangement 17 which is located in the focal plane of the microscope objective 37 and which is able to be imaged from there on a detector. As a result of the configuration of the beam paths of the microscope body, of the first optical arrangement 17, of the second optical arrangement 21, and/or of the optional further imaging beam path 172, it is possible to particularly advantageously image the same object from different sides, either simultaneously or with a time offset, specifically by means of, e.g., the microscope objective 37 of the first optical arrangement 17 or the further microscope objective 174 of the further imaging beam path 172.

The first optical arrangement 17 and/or the second optical arrangement 21 and/or optionally the further imaging beam path 172 could each have a variable lens 186 (see FIG. 9) or a variably adjustable liquid lens—based on electrowetting technology, for example—or a zoom optical unit. Using this, it is possible, for example, to vary the focal position and/or the effective (illumination) aperture of the second optical arrangement 21 in relation to the first beam path 19 or the microscope objective 37 thereof.

Figure 12:
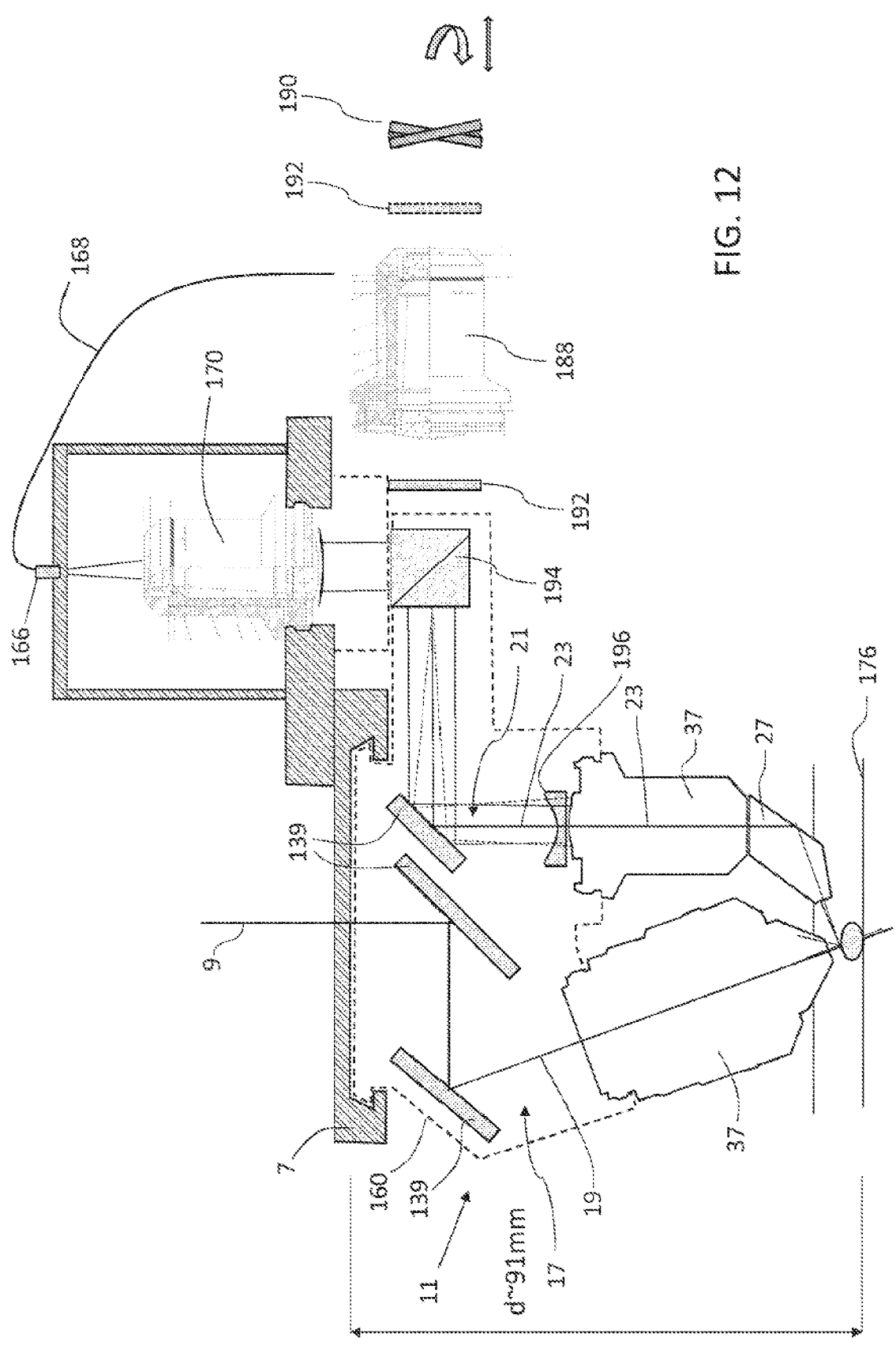
FIG. 12 shows a schematic view of a further exemplary embodiment of an optical module.

Influencing the sample illumination generated by means of the second optical arrangement 21 can alternatively or additionally also be realized using the further exemplary embodiment shown in FIG. 12 (which has a similar structure to the exemplary embodiment of FIG. 10). To this end, a polarization beam splitter 194 is disposed downstream of the collimation optical unit 170 in a suitable fashion, said polarization beam splitter 194 in this exemplary embodiment deflecting the linearly polarized illumination light coming from the collimation optical unit 170 in the direction of the optical unit 188. The optical unit 188 is configured to focus the illumination light. The illumination light then propagates to the movably arranged mirror 190. In FIG. 12, the mirror 190 can be moved to the left or right in the horizontal direction and/or can be tilted in relation to the optical axis of the optical unit 188 (see the two double-headed arrows). After the illumination light has passed through the retardation plate 192 twice, the polarization direction of the illumination light is rotated in relation to the polarization direction of the light coming from the collimation optical unit 170 in such a way that it can pass through the polarization beam splitter 194 substantially in a straight line and consequently illuminates the sample volume 13 via the second beam path 23 of the second optical arrangement 21. The illumination situation in the sample volume 13 can be altered accordingly by moving the movable mirror 190. Thus, the focal position of the light sheet generated can be varied in the propagation direction of the illumination light when the mirror 190 is moved to the left or right in the horizontal direction. An offset or tilt of the light sheet is rendered possible by way of a corresponding tilt of the mirror 190 in relation to the optical axis of the optical unit 188. The retardation plate 192 can be arranged either between the optical unit 188 and the mirror 190 or between the optical unit 188 and the polarization beam splitter 194. Both positions for the retardation plate 192 have been plotted in FIG. 12; however, only a single retardation plate 192 is required in the beam path.

Now, a light sheet within the meaning of a virtual light sheet could be generated in dynamic fashion, for example, using a scanner of the confocal microscope. In this case, no cylindrical lens is arranged in the second beam path 23. Alternatively, it is also possible to produce a static light sheet using the scanner of the confocal microscope, for example if the scanning mirrors of the scanner of the confocal microscope are "parked" in a suitable position, with a suitable cylindrical lens then being arranged at a suitable position in the second beam path 23 (see the cylindrical lens 196 in FIG. 9, for example).

Now, the first optical arrangement 17 and/or the second optical arrangement 21 of the optical module 11 can comprise a microscope objective 37 with finite optics (e.g., calculated to 160 mm and without a tube lens in that case) or infinite optics. In the case where use is made of a microscope objective 37 with infinite optics, provision is made of a tube lens which can be arranged at a suitable position in the optical module 11.

The term "and/or" comprises all combinations of one or more of the associated listed elements and can be abbreviated by "/".

Even though some aspects were described within the scope of an apparatus, it is clear that these aspects also represent a description of the corresponding method, with a block or an apparatus corresponding to a method step or a function of a method step. Analogously, aspects described within the scope of a method step also represent a description of a corresponding block or element or a property of a corresponding apparatus.

REFERENCE SIGNS

1 Microscope
3 Light sheet microscope
4 Confocal microscope
5 Microscope body
7 Mechanical receiving apparatus
9 Microscope beam path
11 Optical module
13 Sample volume
15 Light
17 First optical arrangement
19 First beam path
21 Second optical arrangement
23 Second beam path
25 Optical beam path selector
27 Attachment element
29 Axis of rotation
31 Intersection
33 Opening
35 Stop filter
37 Microscope objective
39 Wavelength-selective optical element
41 Dichroic mirror
43 Light sheet module
45 Light sheet
47 Light source
49 Beam splitter
51 Scanner
53 Point detector unit
55 Confocal module
57 Further wavelength-selective optical element
59 Manipulation light
61 Third wavelength-selective optical element
63 Optical interface
65 Camera
67 Sample stage
69 Sample
71 Light source of visible light
72 Near infrared light source
73 Visible light
75 Near infrared light
77 Fluorescence light
79 Interface for tubes
81 Non descanning detectors
83 Broadband light source
84 Wavelength-changeable light source
85 Wavelength-changing element
87 Acousto-optic transmission filter (AOTF)
89 Illumination beam of the light sheet
91 Confocal illumination beam
93 Confocal illumination beam with a displaced tilt plane
95 Back focal plane
97 Tilt planes
99 Optical unit
101 Illumination light
103 Edge region
105 Further optical unit
107 Afocal optical unit
109 Corrected confocal illumination beam
111 Uncorrected confocal illumination beam
113 Region close to the axis
115 Mirror
115 a First mirror
115 b Second mirror
117 Axis of rotation
119 First angle 121 Second angle
123 Component of illumination light
123 a First component
125 Tilted illumination beam of the light sheet
127 Field of view
129 Artifact
129 a First artifacts
129 b Second artifacts
131 Image data
133 Second reflected component
135 Relative position for the tilted illumination beam of the light sheet
137 Optimal relative position for the non-tilted illumination beam of the light sheet
139 Deflection mirror
141 Transmission characteristic
143 Filter edge
145 First spectral range
147 Second spectral range
149 Light sheet mode
151 First wavelength
153 Second wavelength
155 First microscopy mode
157 Beam path selector changing module
159 Switchover apparatus
160 Housing of (11)
162 Input coupling site
164 Housing part of (11)
166 Fiber coupler
168 Optical fiber
170 Collimation optical unit
172 Further imaging beam path
174 Further microscope objective of (172)
176 Sample holder
178 Optical axis of (9)
180 Optical axis of (17 or 19)
182 Optical axis of (21 or 23)
184 Optical axis of (172)
186 Variable lens
188 Optical unit
190 Movably arranged mirror
192 Retardation plate
194 Polarization beam splitter
196 Cylindrical lens

The invention claimed is:

1. A microscope, which is a confocal microscope converted into a light sheet microscope, the microscope comprising:

a microscope body;

a mechanical receiving apparatus, through which a microscope beam path extends;

an optical module which is attachable to the mechanical receiving apparatus and which is configured to illuminate a sample volume and collect and transmit light from the sample volume, wherein the optical module comprises:

a first optical arrangement with a first beam path, a second optical arrangement with a second beam path that intersects the first beam path in the sample volume, an optical beam path selector which is configured to combine the first beam path and/or the second beam path with the microscope beam path, and an attachment element arranged between the second optical arrangement and the sample volume, wherein the second beam path extends at least in sections through the attachment element in order to generate a light sheet; and an area sensor configured to detect light collected from the sample volume, wherein the microscope is switchable between a first microscopy mode and a light sheet mode, wherein, in the first microscopy mode, the microscope is configured to illuminate the sample volume along the first beam path; and wherein, in the light sheet mode, the microscope is configured to illuminate, with the light sheet, the sample volume along the second beam path.

2. The microscope as claimed in claim 1, wherein the microscope has at least two operating states of the following list of operating states:

a scanning microscopic mode;

a nonlinear illumination mode;

a confocal mode;

a light field mode; and the light sheet mode.

3. The microscope as claimed in claim 2, further comprising a switchover apparatus having at least one element from the following list of elements:

a wavelength-changeable light source;

a light source with at least two different emission wavelengths that are switchable independently of one another;

a wavelength-changing optical element configured to vary a wavelength of radiated-in light;

an optical retardation element configured to vary a polarization of the radiated-in light; and a beam path selector changing module configured to alternately or independently introduce at least two beam path selectors into the microscope beam path.

4. The microscope as claimed in claim 1, wherein the microscope is switchable between the first microscopy mode and the light sheet mode by a switchover apparatus.

5. The microscope as claimed in claim 1, wherein the optical beam path selector is a wavelength-selective optical element.

6. The microscope as claimed in claim 5, wherein the wavelength-selective optical element has at least one spectral filter edge which separates a first spectral range from a second spectral range, the wavelength-selective optical element having different transmission and reflection properties for the first spectral range and for the second spectral range, and wherein:

in the light sheet mode, the spectral filter edge lies spectrally between a first wavelength of light radiated into the sample volume and a second wavelength of light collected from the sample volume, and in the first microscopy mode, the first wavelength and the second wavelength of the light lie together in the first spectral range or in the second spectral range.

7. The microscope as claimed in claim 6, further comprising at least one light source which emits light in at least two different wavelength ranges, wherein the light of the at least one light source of the at least two different wavelength ranges is coupleable independently of one another into the microscope beam path, and wherein the at least two different wavelength ranges of the light source lie in different spectral ranges of the wavelength-selective optical element.

8. The microscope as claimed in claim 6, wherein at least one of the following is/are provided in the first beam path:

a stop filter for attenuating or blocking a reflected component of the second spectral range which is substantially transmitted to the second optical arrangement by the wavelength-selective optical element, and a further optical arrangement for displacing a back focal plane of the first optical arrangement to a different position.

9. The microscope as claimed in claim 8, wherein at least one element is received in repeatedly interchangeable fashion upon attachment of the module to the mechanical receiving apparatus, the at least one receiving element comprising at least one of:

the first optical arrangement;

the second optical arrangement;

the beam path selector; and the stop filter.

10. The microscope as claimed in claim 1, wherein the second optical arrangement is a light sheet module configured to generate a light sheet that passes through the sample volume.

11. The microscope as claimed in claim 1, wherein the microscope beam path is feedable into the optical module in a manner tilted to a normal perpendicular to a back focal plane of the first optical arrangement or the second optical arrangement, and wherein the second optical arrangement or the attachment element is tiltable depending on a tilt of the microscope beam path with respect to the normal of the back focal plane of the second optical arrangement.

12. The microscope as claimed in claim 1, further comprising a further imaging beam path which has a further microscope objective and a further detector, wherein the sample volume is able to be imaged on the further detector by the further microscope objective of the further imaging beam path from a side which faces away from the optical module.

13. The microscope as claimed in claim 12, wherein the further imaging beam path is movable relative to the optical module, or wherein the first optical arrangement is movable relative to the second optical arrangement.

14. The microscope as claimed in claim 1, wherein a further attachment element is arranged between the sample volume and the first optical arrangement.

15. The microscope as claimed in claim 1, wherein an optical axis of the microscope beam path and an optical axis of the first optical arrangement, and/or an optical axis of the second optical arrangement and/or an optical axis of a further imaging beam path, intersect a common object field.

16. The microscope as claimed in claim 1, wherein the first optical arrangement and/or the second optical arrangement and/or a further imaging beam path have a variable lens or a variably adjustable liquid lens or a zoom optical unit.

17. The microscope as claimed in claim 1, further comprising a scanner configured to generate a dynamic light sheet.

18. The microscope as claimed in claim 1, further comprising a cylindrical lens configured to generate a static light sheet.

19. The microscope as claimed in claim 1, wherein the first optical arrangement or the second optical arrangement comprises a microscope objective with finite optics or infinite optics.

20. A microscope, which is a confocal microscope converted into a light sheet microscope, the microscope comprising:

a microscope body;

a mechanical receiving apparatus through which a microscope beam path extends;

an optical module which is attachable to the mechanical receiving apparatus and which is configured to illuminate a sample volume and collect and transmit light from the sample volume, wherein the optical module comprises:

a first optical arrangement with a first beam path, a second optical arrangement with a second beam path that intersects the first beam path in the sample volume, an input coupling site for illumination light configured to illuminate part of the sample volume by way of the second beam path, and an attachment element arranged between the second optical arrangement and the sample volume, wherein the second beam path extends at least in sections through the attachment element; and an area sensor configured to detect light collected from the sample volume, wherein the microscope is switchable between a first microscopy mode and a light sheet mode, wherein, in the first microscopy mode, the microscope is configured to illuminate the sample volume along the first beam path; and wherein, in the light sheet mode, the microscope is configured to illuminate, with a light sheet, the sample volume along the second beam path.

21. An optical module for illuminating a sample volume and for collecting and transmitting light from the sample volume, which is adaptable to a mechanical receiving apparatus of a microscope with a microscope beam path extending through the mechanical receiving apparatus, the microscope comprising an area sensor for detecting light collected from the sample volume, the optical module comprising:

a first optical arrangement with a first beam path;

a second optical arrangement with a second beam path that intersects the first beam path in the sample volume;

an input coupling site for illumination light or an optical beam path selector, the input coupling site being configured to illuminate part of the sample volume by way of the second beam path, or the optical beam path selector being configured to combine the first beam path and/or the second beam path with the microscope beam path; and an attachment element arranged between the second optical arrangement and the sample volume, wherein the second beam path extend at least in sections through the attachment element, wherein the microscope is switchable between a first microscopy mode and a light sheet mode, wherein, in the first microscopy mode, the microscope is configured to illuminate the sample volume along the first beam path; and wherein, in the light sheet mode, the microscope is configured to illuminate, with a light sheet of the microscope, the sample volume along the second beam path.

22. A method for observing a sample volume by a microscope, which is a confocal microscope converted into a light sheet microscope, the method comprising:

transmitting light emitted by the sample volume through an optical module along a first beam path;

guiding a second beam path through an attachment element arranged between a second optical arrangement and the sample volume;

detecting light collected from the sample volume using an area sensor; and carrying out a switchover between a first microscopy mode and a light sheet mode, wherein:

in the first microscopy mode, the sample volume is illuminated through the optical module along the first beam path, the optical module being attached to a microscope body of the microscope; and in the light sheet mode, the sample volume is illuminated using a light sheet of the light sheet microscope along a second beam path that intersects the first beam path in the sample volume.

23. The method as claimed in claim 22, wherein the switchover comprises at least one method step from the following list of method steps:

exchanging an optical beam path selector which combines the first beam path and/or the second beam path with a microscope beam path;

altering a wavelength of illumination light radiated-in by a wavelength-changeable light source and/or a wavelength-changing optical element; and varying a polarization of the radiated-in illumination light by an optical retardation element.

24. The method as claimed in claim 23, wherein:

a region of interest of the sample volume is identified in the light sheet mode;

upon the switchover into the first microscopy mode, the identified region of interest is examined by a scanning microscope with a first resolution that is higher than the light sheet microscope with a second resolution in the light sheet mode; and image data which were generated by the area sensor or a point detector and which represent a light distribution emitted by the sample volume are merged and/or represented together.

25. The method as claimed in claim 23, wherein, upon illumination of the sample volume, light other than the illumination light is radiated onto or into a sample arranged in the sample volume.

* * * * *